United States Patent
Petkus et al.

(10) Patent No.: US 9,643,199 B2
(45) Date of Patent: May 9, 2017

(54) FLUID DISPENSING SYSTEM AND METHODS RELATING THERETO

(71) Applicant: S. C. Johnson & Son, Inc., Racine, WI (US)

(72) Inventors: Matthew Michael Petkus, Lake Villa, IL (US); Bradley J. Barron, Evanston, IL (US); Jonathan D. Bellante, Chicago, IL (US); Stacey L. Forkner, Waterford, WI (US); Hua Han, Evanston, IL (US); Palak Pujara, Monmouth Junction, NJ (US); Ronald H. Spang, Jr., Kenosha, WI (US); Mark J. Van Handel, Greenfield, WI (US); Steven A. Zach, Waterford, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 14/732,384

(22) Filed: Jun. 5, 2015

(65) Prior Publication Data
US 2015/0352571 A1    Dec. 10, 2015

Related U.S. Application Data

(60) Provisional application No. 62/008,806, filed on Jun. 6, 2014.

(51) Int. Cl.
*B05B 11/00* (2006.01)
*B05B 7/24* (2006.01)
(Continued)

(52) U.S. Cl.
CPC ........ *B05B 11/0054* (2013.01); *B05B 7/2464* (2013.01); *B05B 11/3081* (2013.01);
(Continued)

(58) Field of Classification Search
CPC ............. B05B 11/0054; B05B 11/3081; B05B 7/2464; B05B 7/2472; B05B 11/3057; C11D 7/50; C11D 17/041
(Continued)

(56) References Cited

U.S. PATENT DOCUMENTS 5,297,701 A * 3/1994 Steijns ................ B05B 11/0029
                                                    222/153.05
6,843,390 B1   1/2005 Bristor
(Continued)

FOREIGN PATENT DOCUMENTS

WO    95/30491 A1    5/1995
WO    99/19075 A1    4/1999
(Continued)

OTHER PUBLICATIONS

International Search Report and Written Opinion of the International Searching Authority issued in PCT Application No. PCT/US2015/034528, mailed Dec. 16, 2015, 16 pages.

*Primary Examiner* — Donnell Long

(57) ABSTRACT

A sprayer system includes a trigger sprayer having a trigger, a pump mechanism, and a nozzle. The sprayer system further includes a solvent reservoir for accommodating a solvent substance and a bottle for accommodating a concentrate substance. Further, the solvent reservoir is positioned above the trigger sprayer and is in fluid communication with the trigger sprayer and the bottle is positioned below the trigger sprayer and is in fluid communication with the trigger sprayer.

20 Claims, 8 Drawing Sheets

(51) Int. Cl.
  *C11D 17/04* (2006.01)
  *C11D 7/50* (2006.01)
(52) U.S. Cl.
  CPC .............. *C11D 7/50* (2013.01); *C11D 17/041* (2013.01); *B05B 7/2472* (2013.01); *B05B 11/3057* (2013.01)
(58) Field of Classification Search
  USPC ................... 222/1, 136, 464.1, 382, 383.1
  See application file for complete search history.

(56) References Cited

U.S. PATENT DOCUMENTS

| | | |
|---|---|---|
| 7,216,816 B2 | 5/2007 | Hammarth et al. |
| 7,568,636 B2 | 8/2009 | Saunders et al. |
| 7,766,900 B2 | 8/2010 | Leach et al. |
| 7,775,401 B2 | 8/2010 | Banco et al. |
| 7,997,449 B2 | 8/2011 | Banco et al. |
| 8,136,698 B1 | 3/2012 | Beaulieu |
| 8,348,098 B2 | 1/2013 | Bruckner |
| 8,444,620 B2 | 5/2013 | Leach et al. |
| 8,523,017 B2 * | 9/2013 | Vellutato, Jr. ........ B05B 11/0081 222/145.5 |
| 8,544,683 B2 | 10/2013 | Springhorn et al. |
| 2003/0191034 A1 * | 10/2003 | Woo .......................... A61L 9/01 510/101 |
| 2008/0314928 A1 | 12/2008 | Banco et al. |
| 2011/0117259 A1 * | 5/2011 | Storek ..................... A47J 36/14 426/509 |
| 2011/0180619 A1 | 7/2011 | Konishi et al. |
| 2012/0138162 A1 | 6/2012 | Beaulieu |
| 2012/0207651 A1 | 8/2012 | Micheli et al. |
| 2013/0193232 A1 | 8/2013 | Dobias et al. |
| 2013/0233944 A1 | 9/2013 | Burns |

FOREIGN PATENT DOCUMENTS

| | | |
|---|---|---|
| WO | 2012109556 A1 | 8/2012 |
| WO | 2013134556 A1 | 5/2013 |
| WO | 2014/036493 A2 | 3/2014 |
| WO | 2015/134267 A1 | 9/2015 |

* cited by examiner

FLUID DISPENSING SYSTEM AND METHODS RELATING THERETO

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present disclosure generally relates to a system and method for spraying a dispensable mixture, and more specifically, to a system and method for using a sprayer including a reservoir having a solvent therein.

2. Description of the Background of the Invention

Household cleaning typically involves a consumer dispensing a substance to accomplish a specific household task. For instance, a consumer may wish to purchase a furniture cleaner, a bathroom cleaner, an air freshener, and/or other types of cleaners that are designed for use in a specific area of the home. In almost all cases, cleaning supplies and other dispensable substances (e.g., insecticides, air fresheners, etc.) are sold in individual bottles and/or packages and are designed to be dispensed therefrom until the container is empty. After purchasing the dispensable substance, a consumer stores each of the containers and dispenses the substances as needed. When the bottle is empty, the consumer disposes of the bottle and sprayer and purchases a new container having the desired dispensable substance therein. It is not uncommon for a consumer to have many bottles and containers of dispensable substances in a single household.

The use of numerous cleaning supplies and dispensable substances is convenient to the consumer because each of the dispensable substances serves a specific purpose (e.g., deodorizing, air freshening, cleaning, etc.). However, one drawback to the use of several dispensable substances is that each one is sold in a separate package. The use of individual packages may be undesirable due to space constraints in both retail locations and in the home of the consumer. In particular, dispensable substances occupy significant shelf space in a retail location, which may cause the retail location to be larger, not carry as much stock, and/or be overcrowded with product. Similarly, dispensable substances occupy a significant portion of storage space in a consumer's home, which may be particularly problematic in small condominiums in urban areas. An additional drawback associated with the use of dispensable substances is the impact on the environment due to product packaging. In particular, the bottle of each of the dispensable substances must be disposed of after the dispensable substance has been used up.

Some attempts have been made to overcome the aforementioned drawbacks associated with dispensable substances through the use of concentrated dispensable substances. In particular, typical concentrated dispensable substances are sold as a packet that must be mixed with water in a bottle prior to use to form a dispensing system. In these systems, the consumer is usually required to mix an entire batch of the product because the packet is designed to be used with a specific quantity of water. Further, the consumer must utilize one empty bottle for each substance that is to be mixed. After the user mixes the concentrate to form the dispensable substance, the substance may be utilized in a manner consistent with that of the dispensable substances discussed previously herein.

However, the use of concentrated dispensable substances still has numerous drawbacks. For example, consumers are still required to mix the concentrate with water in a separate container and store and/or dispose of the resulting mixture. This process is time consuming, unreliable, and still requires a significant amount of storage space. In particular, the consumer is required to use one spray bottle for each dispensable substance because concentrate products typically require the consumer to create an entire batch, even if the consumer does not need a large quantity of the substance. In instances where a smaller batch may be generated, a consumer still may expend additional time and effort by having to correctly guess the specific amount of substance needed and thereafter prepare additional substance if too little was mixed in the first preparation. Alternatively, the consumer may want to avoid having to mix additional substance by initially mixing extra, which may result in the consumer having to dispose of and/or store the extra amount.

Therefore, there is a need for a system and method that overcomes the aforementioned drawbacks. In particular, there is a need for a system and method that minimizes the amount of storage and/or shelf space required for the dispensable substance. There is a further need for a system and method that is environmentally friendly by reducing waste that must be recycled after the material is consumed and/or minimizes the amount of wasted dispensable material. Still further, there is a need for a system that automatically mixes the exact amount of concentrated substance with a solvent at the time of use without any effort on the part of the consumer. Finally, a need exists for a spray system that can provide a weighted, balanced geometry to assist the consumer in use of the sprayer system, e.g., in connection with cleaning a home.

The present disclosure overcomes some of the aforementioned drawbacks by providing a system and method that includes a trigger mechanism positioned between a solvent reservoir and a bottle filled with concentrated material. The system and method disclosed herein minimizes shelf space required on a retail shelf and reduces the amount of storage space required when not being used by a consumer. Further, the system and method minimizes the environmental impact by reducing the amount of packaging and waste materials that the consumer disposes of when the materials are finished.

SUMMARY OF THE INVENTION

In one aspect, a sprayer system includes a trigger sprayer having a trigger, a pump mechanism, and a nozzle. The sprayer system further includes a solvent reservoir for accommodating a solvent substance and a bottle for accommodating a concentrated substance. Further, the solvent reservoir is positioned above the trigger sprayer and is in fluid communication with the trigger sprayer and the bottle is positioned below the trigger sprayer and is in fluid communication with the trigger sprayer.

In a different aspect, a sprayer system includes a solvent reservoir positioned above and in fluid communication with a trigger sprayer, a concentrate bottle positioned below and in fluid communication with the trigger sprayer, and a dip tube. The trigger sprayer includes a trigger, a pump mechanism, and a nozzle. Further, the pump mechanism includes at least two valves and a mixing chamber.

In still another aspect, a method for directing the use of a sprayer system includes the steps of providing a user with a sprayer system and a bottle including a concentrate. The sprayer system includes a solvent reservoir, a trigger, a pump mechanism, and a nozzle. The method also includes the step of providing instructions for stain removal, which comprise the steps of unpacking the sprayer system, selecting and attaching the bottle to the sprayer system, filling the solvent reservoir with hot water, pointing the nozzle at a stained surface and squeezing the trigger of the sprayer system, letting the stained surface sit for a predetermined dwell time, and cleaning the stained surface.

According to one aspect of the disclosure, a fluid dispensing system includes a selected fill volume solvent reservoir and a trigger sprayer attached to the solvent reservoir. The trigger sprayer further includes a trigger, a pump mechanism, and a nozzle. Further, the system includes a bottle of concentrate. The trigger sprayer is configured between the solvent reservoir and the bottle of concentrate to provide an internal ergonomic geometry therein.

According to another aspect of the disclosure, a method for directing the use of a sprayer includes directing the user to affix a sprayer including a solvent reservoir to a neck of a bottle containing a concentrate. The method further includes directing a user to fill the solvent reservoir with a solvent to a selected fill volume to provide an internal ergonomic geometry of the sprayer positioned between the bottle and the solvent reservoir. Further, the method includes directing the user to aim the sprayer at an area to be cleaned. The method also includes directing the user to actuate a trigger of the sprayer to spray a mixture of the solvent and the concentrate onto the area to be cleaned. Finally, the method includes directing the user to clean the area to be cleaned by wiping the mixture with a cleaning material, e.g., a paper towel or cloth.

According to a different aspect of the disclosure, a kit for preparing a dispensable substance is provided. The kit includes a selected fill volume solvent reservoir and a trigger sprayer attached to the solvent reservoir. The trigger sprayer further includes a trigger, a pump mechanism, and a nozzle. A bottle of concentrate is provided. User instructions are also provided, which include instructions to direct a user to affix the trigger sprayer to a neck of the bottle of concentrate so that the trigger sprayer is disposed between the bottle and the reservoir, directing the user to fill the solvent reservoir with a solvent to a selected fill volume, directing the user to aim the nozzle at an area to be cleaned, directing the user to actuate the trigger of the trigger sprayer to spray a mixture of the solvent and the concentrate onto the area to be cleaned, and directing the user to clean the area to be cleaned by wiping the mixture with a cleaning material, e.g., a paper towel or cloth.

BRIEF DESCRIPTION OF THE DRAWINGS

Other aspects and advantages of the present invention will become apparent upon consideration of the following detailed description, wherein similar structures have similar reference numerals.

DETAILED DESCRIPTION

Figure 1:
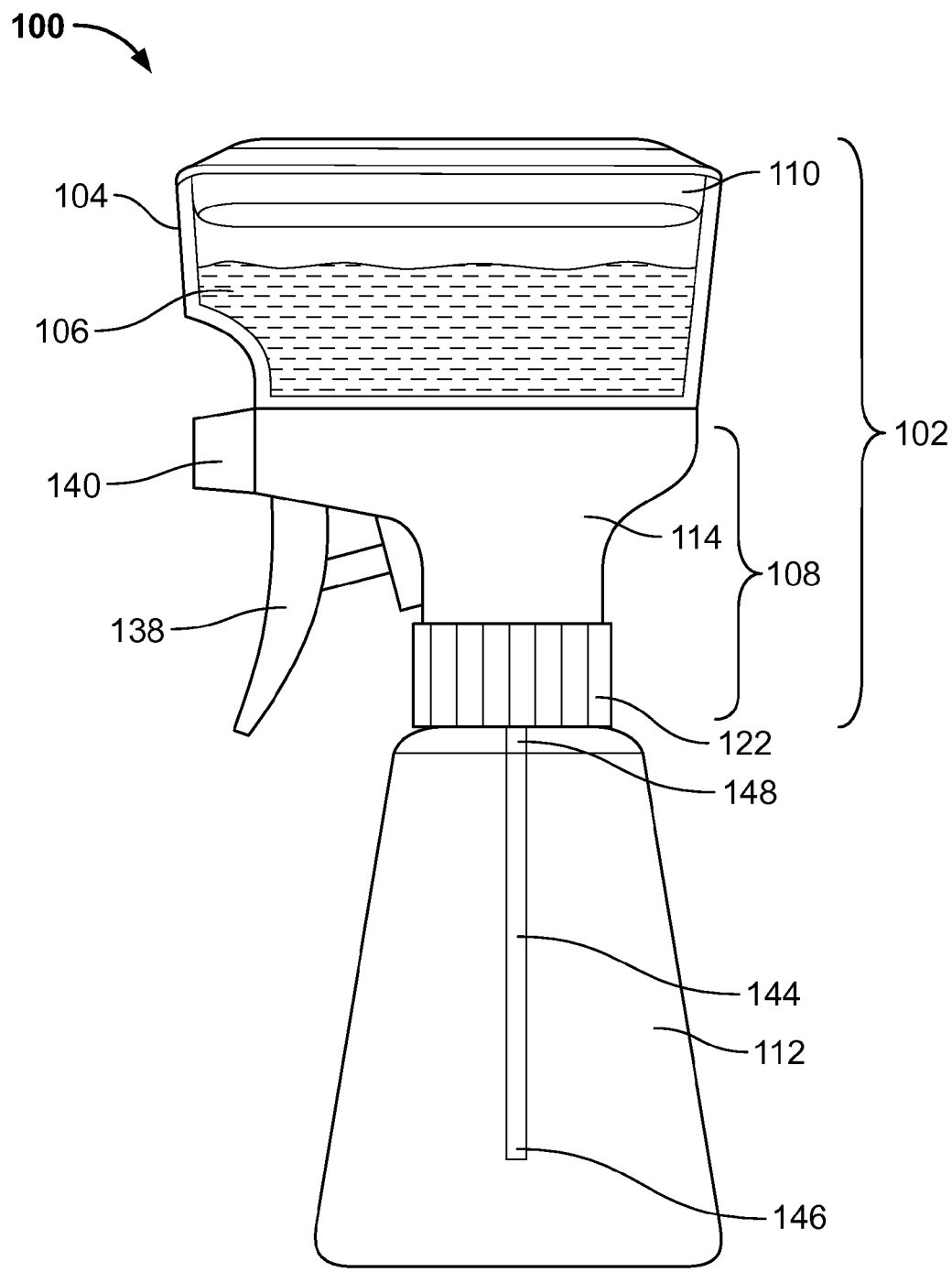
FIG. 1 is a side elevational view of a sprayer system according to one embodiment.

Referring to FIG. 1, a sprayer system 100 is depicted. The sprayer system 100 is designed to be utilized in connection with any of the methodologies described herein. The sprayer system 100 comprises a sprayer head 102 having a solvent reservoir 104 for accommodating a solvent substance 106 positioned above a trigger sprayer 108. The solvent reservoir 104 includes a reservoir lid 110 and has a fill volume for storing the solvent. The sprayer head 102, comprised of the trigger sprayer 108, the solvent reservoir 104, and the reservoir lid 110, is designed to be attached to a bottle 112 accommodating a concentrated form of a dispensable substance.

The sprayer system 100 generally includes a housing provided in the form of the trigger sprayer 108 positioned between the solvent reservoir 104 and the bottle 112. The trigger sprayer 108 provides a shell that protects and supports internal components of the sprayer system 100. In other embodiments, the internal components of the sprayer system 100 may be mounted to a support structure instead of being enclosed by the housing. In a further embodiment, the housing is defined by a structure that supports a pump mechanism 114. The housing may be any shape and/or size so long as it is capable of accommodating the solvent reservoir 104 and attaching to the bottle 112. In one specific embodiment, the housing is monolithic and/or is provided as a single piece.

The solvent reservoir 104 is positioned above the trigger sprayer 108 and is in fluid communication with the trigger sprayer 108. The solvent reservoir 104 is designed to hold the solvent substance 106 and is provided in the form of a container defined by a bottom surface in contact with trigger sprayer 108 and sidewalls extending upwardly from the bottom surface. Although a specific solvent reservoir 104 is depicted in FIG. 1, other solvent reservoirs 104 may be used consistent with the functions described herein.

The solvent reservoir 104 may be made of suitable materials that are inert and not reactive with water or the solvent substance 106. For example, one or more portions of the solvent reservoir 104 may be constructed of a polymer, vinyl, glass, fiberglass, metal, ceramic, wood, or of any combination thereof. One or more portions of the solvent reservoir 104 may be constructed of clear materials, translucent materials, opaque materials, and/or of any combination thereof to enable the end user to observe the quantity of the solvent substance 106 therein. The solvent reservoir 104 may be configured to be circular, octagonal, rectangular, polygonal, cross-shaped, irregular, D-shaped, crescent-shaped, or any combination thereof that will provide a geometry that may be accommodated by the trigger sprayer 108 positioned below the solvent reservoir 104.

The solvent reservoir 104 is provided with the sprayer system 100 to accommodate the solvent substance 106. In a preferred embodiment, the solvent substance 106 comprises water, including but not limited to, tap water, distilled water, spring water, mineral water, deionized water, or any other appropriate type of water for use as a dispensable solvent, or any combination thereof. In other embodiments, the solvent substance 106 may comprise water, bleach, vinegar, an anti-bacterial solution, a deodorizing and/or a cleaning substance, a surfactant solution, a chelant solution, a degreasing solution, a soap solution, an alcohol, an insecticide, an enzyme solution, a color changing dye or indicator, a fragrance, a corrosion inhibitor, an anti-microbial, a preservative, an odor eliminator, a pH-adjuster, a surfactant, a solvent mixed with particulates (e.g. baking soda, particles, aggregate particles, nanoparticles, powders, or salts), or the like, or combinations thereof.

In other embodiments, the solvent substance 106 may comprise a color-changing dye or indicator. A color-changing dye or indicator may include a compound which is used to indicate a change in status in relation to the solvent substance 106 containing the dye/indicator. For example, in a cleaning composition the composition can be provided with a first color which changes to a second color following application to a surface to be cleaned to indicate, for example, that sufficient contact time has occurred to provide adequate cleaning of the surface. Alternatively, the cleaning composition may have a first color upon dispensing and a second color upon movement over a surface to be cleaned to indicate working of the cleaner. In a further embodiment, the solvent substance 106 may have a first color within the solvent reservoir 104 and a second color upon dispensing over a surface to be cleaned to indicate adequate mixing of the solvent substance 106 and the concentrate within the bottle 112 for activation of the cleaning composition.

Solvent substance 106 may include color-changing dyes or indicators suitable for use in a composition containing a chelating system and may include any compound or chemical capable of changing color to provide a color-changing cleaning composition. The color change process can be achieved by various mechanisms or different agents and include natural ingredients, synthetic colorants, pH-sensitive dyes (acid-base indicators), oxidation-reduction indicators, luminescent indicators, thermochromic indicators, photochromic indicators, piezochromic indicators, encapsulated colorants, and the like as otherwise known for such color-changing use.

In one embodiment, the solvent substance 106 may include preferred color-changing dyes or indicators for use in cleaning compositions that are pH-sensitive dyes or acid-based indicators. Examples of such dyes suitable for use include thymolphthalein, carvacrophthalein, o-cresolphthalein, o-cresolphthalein complexone, dixylenophthalein, guaiacolphthalein, α-naphtholphthalein, henolphthalein, phenolphthalein, disodium tetrabromophenolphthalein, xylenolphthalein, and mixtures thereof. Specific examples of the above and other color-changing dyes and indicators known in the art and suitable for use herein are disclosed in U.S. Patent Publication No. 2009/0176673 A1. The preferred color-changing dyes are thymol-phthaleins.

The solvent reservoir 104 includes the reservoir lid 110 for enclosing the solvent substance 106 inside the solvent reservoir 104 of the sprayer system 100. The reservoir lid 110 provides a fluid tight seal to isolate a selected fill volume of the solvent substance 106 from the environment. The reservoir lid 110 may be made of suitable materials that are inert and not reactive with water or the solvent substance 106. For example, one or more portions of the reservoir lid 110 may be constructed of a polymer, vinyl, glass, rubber, fiberglass, metal, ceramic, wood, a laminated material, or combinations thereof. The reservoir lid 110 may be of a geometry to complimentarily fit the open side walls of the solvent reservoir 104 and provide the fluid tight seal therebetween. The reservoir lid 110 may be used to enclose and isolate the solvent substance 106 securely within the confines of the sidewalls of the solvent reservoir 104. The fluid tight seal of the reservoir lid 110 may prevent loss of the solvent substance 106 by spilling or evaporation, or contamination of the solvent substance 106 by particulates, microorganisms, bacteria, dust, dirt, pollution, or a combination thereof that may be present within the environment.

Figure 2:
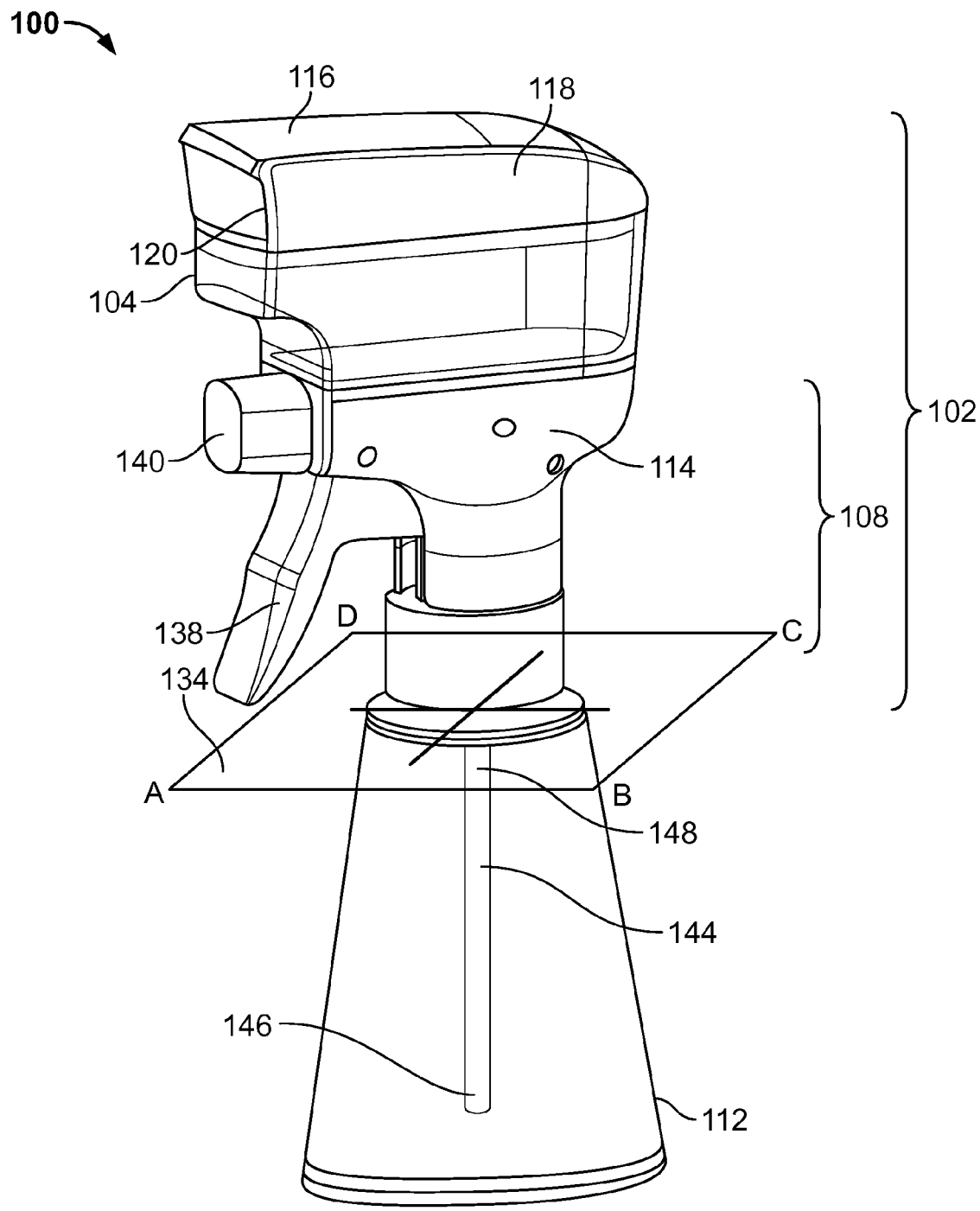
FIG. 2 is a perspective view of a sprayer system according to one embodiment.

In an alternative embodiment, the fluid tight seal of the reservoir lid 110 may include a hinge. For example, FIG. 2 illustrates a perspective view of a particular embodiment of the sprayer system 100 that includes a molded fluid tight reservoir lid 116 including a molded hinge (not shown), and an extended side wall 118 of the solvent reservoir 104. As shown, the extended side wall 118 of the solvent reservoir 104 may include a pour spout 120 (shown in a closed configuration) to facilitate transfer of the solvent substance 106 from the solvent reservoir 104 of the sprayer system 100. Thus, the reservoir lid 116 provides a fluid tight seal between the extended wall 118, the pour spout 120 of the solvent reservoir 104, and the solvent reservoir 104.

Figure 3:
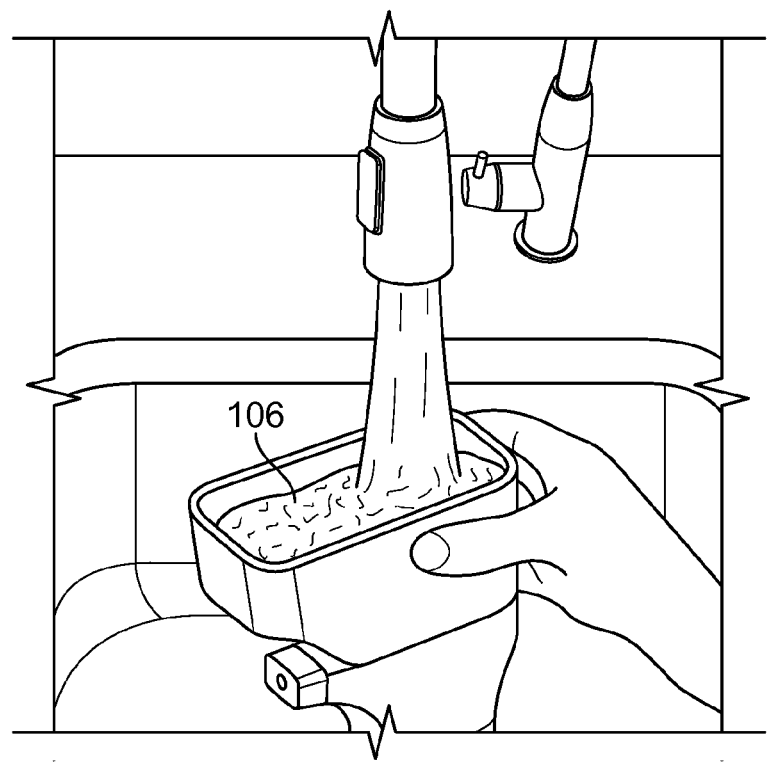
FIG. 3 is a perspective depiction of the sprayer system of FIG. 1 showing a solvent reservoir of the sprayer system being filled.

It is envisioned that the solvent reservoir 104 affixed to the trigger sprayer 108 is capable or readily capable of being refilled or reused by the user. With reference to FIG. 3, a particular embodiment is depicted in which the solvent substance 106 is refilled by the user.

Figure 4:
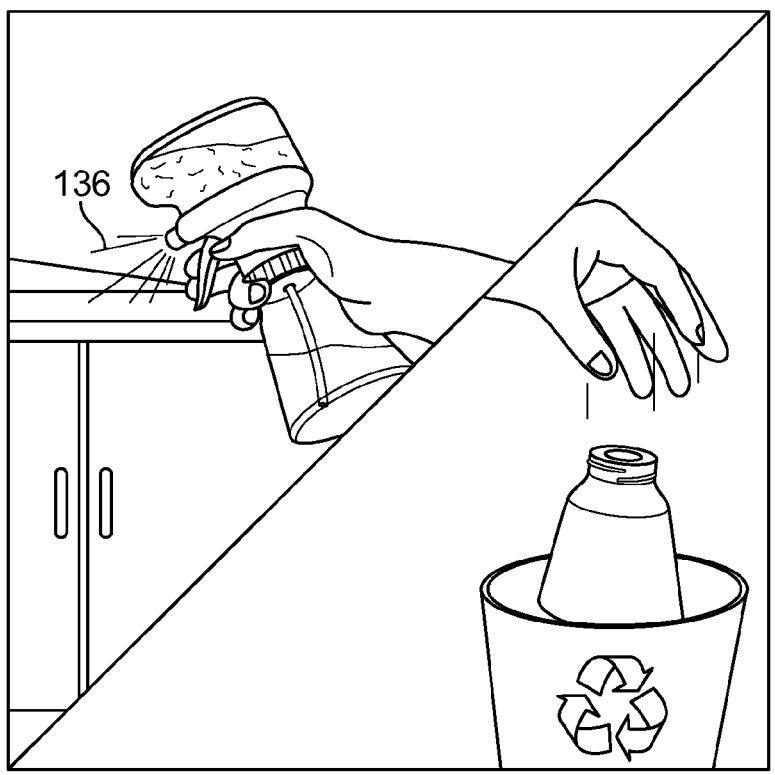
FIG. 4 is a perspective depiction of the sprayer system of FIG. 1 in which a user is dispensing a dispensable mixture from the sprayer system and discarding a bottle to be recycled.

Once the concentrate is exhausted from the bottle 112, the emptied bottle 112 may be disposed of and/or recycled (see FIG. 4). The user may then attach a new concentrate filled bottle 112 to the trigger sprayer 108 via a threaded coupling of a threaded connector 122 (see FIG. 5) and threads 124 disposed on a neck 126 of the bottle 112.

One of the advantages of the sprayer system 100 is the facility and ease of refilling the solvent reservoir 104 due to the opening of the reservoir lid 110 rather than of the unscrewing of the trigger sprayer 108 from the bottle 112. In one embodiment, the ease of refilling of the solvent reservoir 104 allows for a compact solvent reservoir size. Due to a reduced reservoir size as compared to conventional spray systems, the resulting sprayer system 100 is lightweight and small in size. Thus, the sprayer system 100 facilitates cleaning in tight places and provides an overall convenient carrying size.

Figure 5:
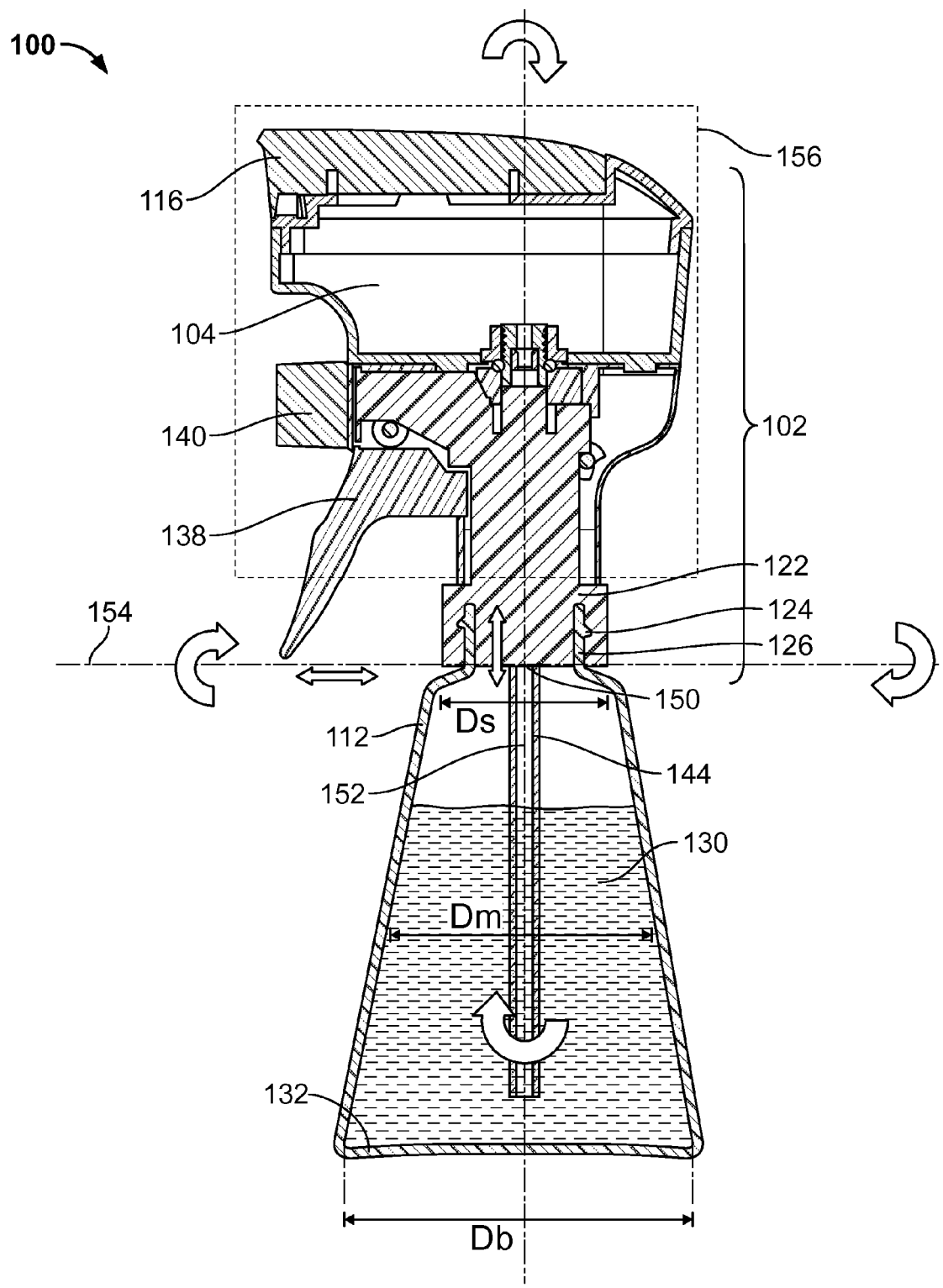
FIG. 5 is a partial cross-sectional, side elevational view of an embodiment of a sprayer system similar to the one depicted in FIG. 2.

The bottle 112 is positioned below the trigger sprayer 108 and is in fluid communication with the trigger sprayer 108. As shown in FIG. 5, the bottle 112 is designed to hold a concentrated substance 130 (i.e., a concentrate). The bottle 112 is defined by a bottom surface 132 and sidewalls extending upwardly from the bottom surface toward the neck 126 for attachment of the bottle 112 to the trigger sprayer 108. Although a specific bottle 112 is depicted in FIGS. 1, 2, 4, and 5, other bottles 112 may be used consistent with the functions described herein. The bottle 112 may comprise any reservoir that is capable of holding the concentrate 130. In one embodiment, the bottle 112 may be provided with the concentrate 130 therein. For example, the bottle 112 could include a concentrated form of a commercially available pre-packaged cleanser such as PLEDGE® or WINDEX® sold by S. C. Johnson & Son, Inc. In a different embodiment, the bottle 112 may be provided as an empty reservoir or bottle that is designed to be filled with the concentrate 130.

The bottle 112 may be made of suitable materials that are inert and not reactive with the concentrate 130. For example, one or more portions of the bottle 112 may be constructed of a polymer, vinyl, glass, fiberglass, metal, ceramic, wood, or of any combination thereof. One or more portions of the bottle 112 may be constructed of clear materials, translucent materials, opaque materials, and/or of any combination thereof to enable the end user to observe the quantity of the concentrate 130 therein. The bottle 112 may be configured to be cylindrical, cubic, prism-shaped, pyramid-shaped, or cone-shaped, having a bottom surface 132 shape that is circular, triangular, square, octagonal, rectangular, polygonal, cross-shaped, irregular, D-shaped, crescent-shaped, or any combination thereof that will provide a geometry that may accommodate attachment to the trigger sprayer 108 positioned above the bottle 112. One of the advantages of the sprayer system 100 is the versatility of the many possible structural geometries of the bottle 112 and the solvent reservoir 104 available to provide a weighted and internally balanced geometry that facilitates storage of the sprayer system 100 or use of the sprayer system 100. For example, the geometry of the bottle 112 may include a cross-shape geometry to provide a more stable base component with less probability of tipping over during storage or between uses.

As shown in FIG. 5, the circular bottom surface 132 may include a diameter Db that may be less than about 100 mm, about 90 mm, about 80 mm, about 70 mm, about 60 mm, about 50 mm, or about 40 mm. The bottle 112 may also include a diameter Dm at a mid-volume point that may be less than about 90 mm, about 80 mm, about 70 mm, about 60 mm, about 50 mm, about 40 mm, or about 30 mm. The concentrate bottle 112 may further include a diameter Ds at a shoulder of the bottle 112 that may be less than about 80 mm, about 70 mm, about 60 mm, about 50 mm, about 40 mm, about 30 mm, or about 20 mm. In a preferred embodiment, the diameter of the bottom surface Db may be about 68 mm, the diameter at the mid-volume point Dm may be about 55 mm, and the diameter at the shoulders Ds may be about 41 mm.

In one embodiment, the bottle 112 may be pre-filled or refilled to a selected fill volume by a user. During a filling procedure the user may fill or place into the bottle 112 a selected fill volume of the concentrate 130 less than or equal to an absolute fill volume defined by the shape, size, and volume of the bottle 112. The selected fill volume held by the bottle 112 may comprise a volume of finite quantity or finite supply and may be uninterrupted by outside concentrate sources. In fact, once the concentrate has been filled to the selected fill volume, no further addition of the concentrate 130 is added to the bottle 112 until a refilling procedure is undertaken. The selected fill volume or prefilled volume of the bottle 112 may comprise less than 1 liter (L), less than 500 milliliters (mL), less than 250 mL, less than 100 mL, from about 10 mL to about 50 mL, from about 50 mL to about 100 mL, from about 100 mL to about 250 mL, from about 250 mL to about 500 mL, or from about 100 mL to about 500 mL. In one embodiment, the selected fill volume or the prefilled volume may be less than or equal to the absolute fill volume of the bottle 112 and may be about 89 mL, or about 3 ounces. Once the bottle 112 is filled to the selected fill volume with the concentrate 130, the user may then attach the refilled concentrate bottle 112 to the trigger sprayer 108 via the threaded coupling of the threaded connector 122 (see FIG. 5) and threads 124 disposed on the neck 126 of the bottle 112.

As illustrated in the embodiments of FIGS. 1-5, the trigger sprayer 108 is shown located between the solvent reservoir 104 and the bottle 112 and configured so that the solvent reservoir 104 is located above the trigger sprayer 108 and the bottle 112 is located below the trigger sprayer 108. It may be noted that no portion of the solvent reservoir 104 is coincident with or crosses the bottle 112. As shown in FIG. 2, a plane 134 may be defined by points A, B, C, and D in which the plane 134 intersects with at least one point of a distal end of the neck 126 of the bottle 112 and with which no portion of the solvent reservoir 104 intersects.

Referring back to FIG. 5, the concentrate 130 contained within the bottle 112 is preferably a concentrated form of a dispensable substance (i.e., a substance that is easily dispensed) that is designed to be mixed with a solvent. The concentrate 130 may be that of a fragrance or an insecticide, a deodorizing and/or a cleaning substance, a polisher and/or a shining substance, or the like, or combinations thereof. The concentrate 130 may also comprise other actives, such as a sanitizer, an air freshener, an odor eliminator, a mold or mildew inhibitor, an insect repellent, shear thinning thickeners, an insecticide, an enzyme, and/or the like, and/or have aromatherapeutic properties, or combinations thereof. Indeed, it is also envisioned that the bottle 112 may be used to hold a flavor enhancer for the food or beverage industry or a food article, such as vinegar or oil. Alternatively, the bottle 112 may hold a material related to the home improvement industry, e.g., a paint application. In another embodiment the concentrate 130 may comprise an additive, such as a nourishing oil. In a particular embodiment the nourishing oil is almond oil. In a different embodiment a personal care material is provided in the bottle 112, such as a cosmetic, a hair dye, a spray tan, sunscreen, or the like, or combinations thereof. In fact, the concentrate 130 may be provided in any form within the bottle 112 including in liquid form and may comprise any material. In another embodiment, the concentrate 130 may be combined with a solvent substance 106 that may provide an efficacious function in addition to being a diluent. For example, the concentrate 130 may comprise a cleanser and may be mixed with the solvent substance 106 that may comprise a disinfectant. Thus, the mixed solution of the cleanser and the disinfectant may provide both functions of cleansing and disinfection. In another embodiment, the concentrate 130 may be mixed with a solvent substance 106 to form a super concentrated substance. In yet another embodiment, the concentrate 130 may comprise a substance that is not an extract or a distillation of a substance. For example, the concentrate 130 may comprise a diluent, such as a mild and/or dilute liquid cleanser that may be mixed with a strong and functionally efficacious solvent substance 106 such as a bleach. In a further embodiment, the concentrate 130 may comprise a substance that is a non-concentrate that may be mixed with an additive solvent substance 106. For example, the concentrate 130 may comprise a non-concentrated cleanser that may be mixed with a solvent substance 106 comprising a polishing additive to provide a dispensable mixture 136 (see FIG. 4) that facilitates cleaning and polishing furniture. In an alternative non-limiting example, the concentrate 130 may comprise a non-concentrated oil that may be mixed with a solvent substance 106 comprising a vinegar additive to provide an edible dispensable mixture 136. In another alternative non-limiting example, the concentrate 130 and the solvent substance 106 are two different, stable substances that are otherwise unstable when mixed and stored together. The sprayer system 100 allows a user to combine the stable concentrate 130 with the stable solvent substance 106 and dispense a dispensable mixture 136 that is not offered by a conventional sprayer system.

Referring back to FIG. 1, the trigger sprayer 108 of the sprayer system 100 further includes the pump mechanism 114 to facilitate mixing of the concentrate 130 and the solvent substance 106. The pump mechanism 114 may comprise any mechanism that facilitates the mixing in such a manner so as to mix a portion of the concentrate 130 with a quantity of the solvent substance 106.

In one embodiment, the pump mechanism 114 is provided in the form of a single pumping mechanism, which is known in the art. In another embodiment, the pump mechanism 114 may be provided by way of two separate pumps. In this embodiment, the first pump is in communication with the concentrate 130 and the second pump is in communication with the solvent substance 106.

Still referring to FIG. 1, the trigger sprayer 108 of the sprayer system 100 generally includes an actuation mechanism that is responsible for the mixing and/or dispensing process. In the illustrated embodiment of FIG. 1, the actuation mechanism is provided by a trigger 138 attached to the trigger sprayer 108. In another embodiment, the actuation mechanism may be provided in the form of a button, a lever, and/or one or more flanges that communicate with the internal components of the sprayer system 100. It is contemplated that the actuation mechanism is in communication with one or more of the pumps, valves, and other internal components to facilitate dispensing. In one particular embodiment, numerous actuation mechanisms may be provided to control one or more of the flow of the concentrate, the flow of the solvent substance 106, and the dispensing of the dispensable mixture 136 (see FIG. 4) from the sprayer system 100.

The dispensable mixture 136 comprises a resultant mixture (i.e., a mixture resulting from the mixing of the concentrate 130 and the solvent substance 106) that is released by the actuation mechanism of the trigger 138 of the sprayer system 100. The dispensable mixture 136 may comprise a diluted concentrate, a concentrate with an additive, a mixture of one or more concentrates and one or more diluents, a mixture of diluents, a mixture of concentrates, or the like, or any combination thereof.

The trigger sprayer 108 of the sprayer system 100 further includes a nozzle 140, which includes an outlet orifice for dispensing the dispensable mixture 136 into the environment. The nozzle 140 may further include a mixing chamber 142 (see FIG. 6) therein such that the concentrate 130 and solvent substance 106 are mixed to form the dispensable mixture 136 just prior to exiting the sprayer system 100. The nozzle 140 may also be provided with additional components as known in the art including, for example, a swirl chamber (not shown) for imparting turbulent flow to the dispensable mixture 136 or to otherwise affect the emitted spray pattern of the dispensable mixture 136. In one example, the nozzle 140 may be rotatable and can produce a fan spray in one position, a stream spray in another position, and a foaming spray in yet another position. In a different embodiment, the nozzle 140 can produce only one spray pattern, such as a fan spray pattern, a stream spray pattern, or a foaming spray pattern. In an alternative embodiment the spray pattern can be effected by properties of the dispensable mixture 136 itself, without the use of the nozzle 140 having additional components, such as a swirl chamber.

The sprayer head 102, comprised of the trigger sprayer 108 and the solvent reservoir 104, is attachable to the bottle 112 via the threaded connector 122. The threaded connector 122 includes threads 124 (see FIG. 5) disposed on the neck 126 of the bottle 112 and corresponding threads (not shown) disposed on the trigger sprayer 108 of the sprayer head 102 to facilitate attachment thereof. However, it is also contemplated that any type of connection mechanism may be used to join the sprayer head 102 to the bottle 112 as would be known to one of skill in the art. For example, the connector of the sprayer head 102 may include an amorphous material that conforms to the threads 124 of the bottle 112 to create a seal, a malleable or semi-malleable material that deforms when the sprayer head 102 is joined to the bottle 112 and hardens and/or solidifies to retain the sprayer head 102 thereon, and/or a mechanism for creating an interference fit with a neck 126 of the bottle 112. In a different embodiment, the connector of the sprayer head 102 may otherwise include an adjustable mechanism for tightening around a threaded or non-threaded portion of a container to create a fluid tight seal.

The sprayer system 100 may be provided with an adapter (not shown) that is designed to be utilized with an attachment mechanism (e.g., thread connector 122) to allow the sprayer system 100 to be used with bottles 112 comprising different geometries, shapes and/or sizes. The adapter may allow the attachment mechanism to be affixed to the bottle 112 in the event that the bottle 112 includes a geometry that is non-uniform or non-standard (e.g., does not include a circular opening). In some embodiments, one or more adapters are provided that allow the sprayer system 100 to be utilized both with a first container having an opening with a first geometry, and a second container having an opening with a second different geometry.

Turning again to FIG. 1, the sprayer head 102 is provided with a dip tube 144 having a distal end 146 that protrudes downwardly and is designed to be inserted into the bottle 112 to retrieve the concentrate 130 therefrom. An opposing end 148 of the dip tube 144 is in fluid communication with the pump mechanism 114. A fluid passageway (not shown) extends from the pump mechanism 114 and is in fluid communication with the nozzle 140. The mixing chamber 142 (see FIG. 6) lies within the pump mechanism 114 and is in fluid communication therewith. The mixing chamber 142 is upstream of the dip tube 144 and downstream of the outlet orifice of the nozzle 140.

In use, the user connects the sprayer head 102, including the trigger sprayer 108 and the solvent reservoir 104, to the bottle 112 containing the concentrate 130. Alternatively, the bottle 112 may be commercially available already pre-attached to the sprayer head 102. In the embodiment shown in FIG. 5, the bottle 112 and the sprayer head 102 are mated via threads 124 as the bottle 112 and the threaded connector 122 of the sprayer head 102 are joined and rotated as known in the art. After the sprayer head 102 is connected to the bottle 112, the user may fill the solvent reservoir 104 with the solvent substance 106 as shown in FIG. 3.

During a filling procedure the user may fill or place into the solvent reservoir 104 a selected fill volume of solvent substance 106 less than or equal to an absolute fill volume defined by the shape, size, and volume of the solvent reservoir 104. The selected fill volume held by the solvent reservoir 104 may comprise a volume of finite quantity or finite supply and may be uninterrupted by outside solvent sources (e.g., water hoses). In fact, once the solvent reservoir 104 has been filled to the selected fill volume, no further addition of solvent substance 106 is added to the solvent reservoir 104 until a refilling procedure is undertaken. The selected fill volume of the solvent reservoir 104 may comprise less than 1 liter (L), less 500 milliliters (mL), less than 250 mL, less than 100 mL, from about 10 mL to about 200 mL, from about 10 mL to about 50 mL, from about 50 mL to about 100 mL, from about 50 mL to about 80 mL, from about 100 mL to about 250 mL, from about 250 mL to about 500 mL, or from about 100 mL to about 500 mL. Once the solvent reservoir 104 is filled to the selected fill volume with the solvent substance 106, the reservoir lid 110 may be closed via the liquid tight seal to enclose and isolate the solvent substance 106 securely within the confines of the solvent reservoir 104.

Although only the single solvent reservoir 104 is illustrated in FIGS. 1-5 in fluid communication with the pump mechanism 114 of the trigger sprayer 108, in other embodiments the sprayer system 100 may further include a second solvent reservoir, three or more solvent reservoirs, or a plurality of solvent reservoirs that are in fluid communication with the pump mechanism(s) 114. Thus, a sprayer system 100 using one or more solvent reservoirs 104 may provide the user with the option of employing one or more solvent substances 106 simultaneously or alternatively (in addition to the concentrate 130 supplied by the bottle 112) by action of the pump mechanism 114.

Similarly, although only the single concentrate bottle 112 is illustrated in FIGS. 1-5 in fluid communication with the pump mechanism 114 of the trigger sprayer 108, in other embodiments the sprayer system 100 may further include a second concentrate bottle, three or more concentrate bottles, or a plurality of concentrate bottles that are in fluid communication with the pump mechanism(s) 114. Thus, a sprayer system 100 using one or more concentrate bottles 112 may provide the user with the option of employing one or more concentrates 130 simultaneously or alternatively (in addition to the solvent substance 106 supplied by the solvent reservoir 104) by action of the pump mechanism 114.

Once the solvent reservoir 104 is filled with a selected solvent substance 106, the user may squeeze the trigger 138 to discharge a mixture, i.e., the dispensable mixture 136, of the concentrate 130 and the solvent substance 106 from the pump mechanism 114 through the nozzle 140. In one embodiment, the sprayer head 102 may be primed by pulling and releasing the trigger 138, which causes a metered dose of the concentrate 130 to be drawn upwardly from the bottle 112, through the dip tube 144, and into the pump mechanism 114. Alternatively, the metering of the concentrate 130 may be effected by a separate metering or valving structure or portion of the pump mechanism 114. Simultaneously, the pulling and releasing of the trigger 138 draws a metered dose of the solvent substance 106 from the solvent reservoir 104 above the trigger sprayer 108 into the pump mechanism 114. Similarly, the metering of the solvent substance 106 may be effected by a separate metering or valving structure or portion of the pump mechanism 114. The concentrate 130 is mixed with the solvent substance 106 within the pump mechanism 114 or in the discrete mixing chamber 142 (see FIG. 6) to form the dispensable mixture 136 that is then released and sprayed out of the nozzle 140.

Figure 6:
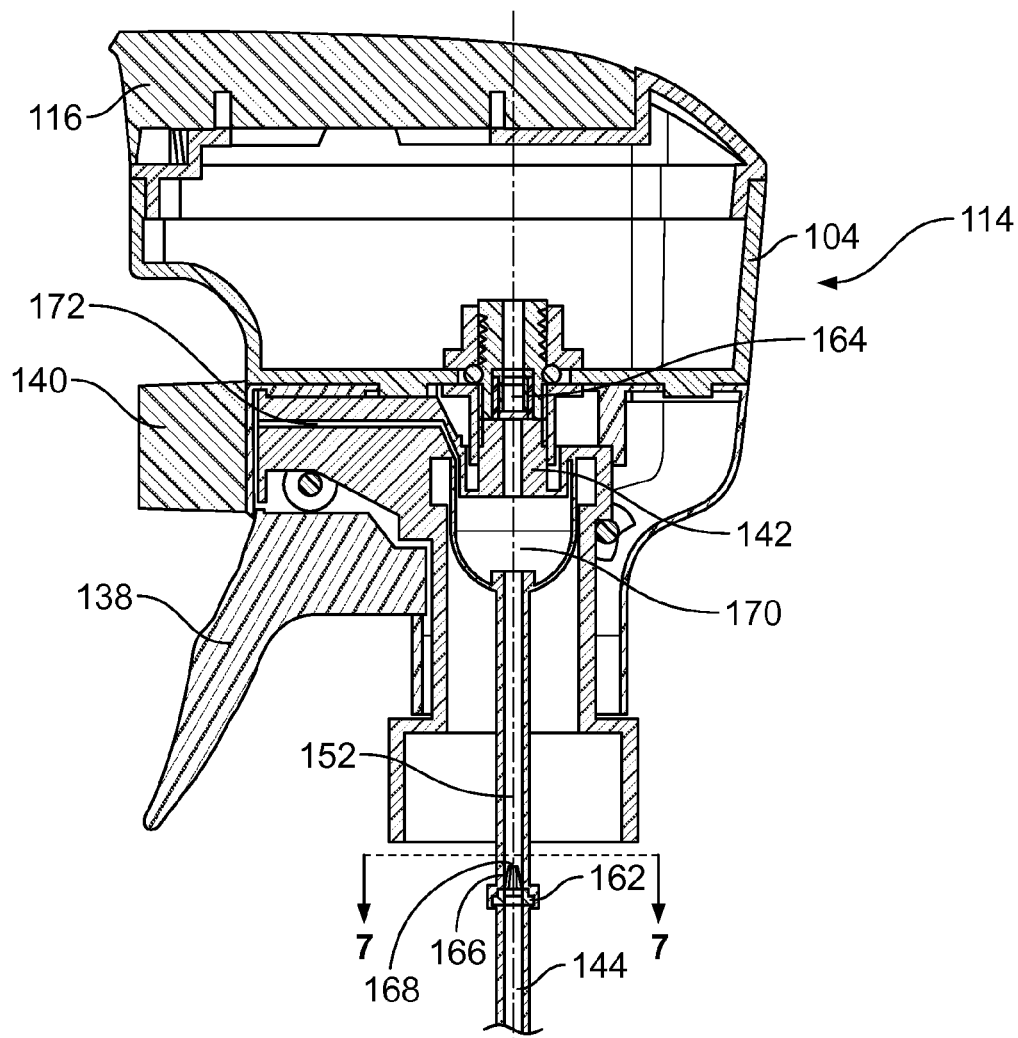
FIG. 6 is a partial cross-sectional, side elevational view of an embodiment similar to that shown in FIG. 5, with a solvent reservoir and a pump mechanism depicted.

One particular embodiment of the pump mechanism 114 is shown in FIG. 6. The pump mechanism 114 includes at least two valves, e.g., a concentrate valve 162 and a solvent valve 164. In other embodiments, the pump mechanism 114 includes fewer than two valves. As shown in FIG. 6, the concentrate valve 162 is in fluid communication with and positioned between the dip tube 144 and the mixing chamber 142 while the solvent valve 164 is in fluid communication with and positioned between the solvent reservoir 104 and the mixing chamber 142. The concentrate valve 162 prevents any backflow from the mixing chamber 142 from entering the dip tube 144 and/or backflow from the mixing chamber 142 from reaching a distal end 146 of the dip tube 144 in direct fluid communication with the concentrate 130. The solvent valve 164 prevents any backflow from the mixing chamber from entering the solvent reservoir 104. The concentrate valve 162 and the solvent valve 164 may be one of a duckbill valve, a flap valve, a disk valve, or any other type of valve which imparts a one-way fluid flow known in the art. In one embodiment, the concentrate valve 162 and the solvent valve 164 are both the same type of valve. In another embodiment, the concentrate valve 162 and the solvent valve are each a different type of valve. The concentrate valve 162 and the solvent valve 164 may be formed from fluorosilicone, silicone, styrene-butadiene, nitrile, ethylene-propylene-diene-monomer (EPDM), natural rubber, butyl, ethylene, polyurethane, fluorocarbon, neoprene, or polytetrafluoroethylene (PTFE).

Figure 7:
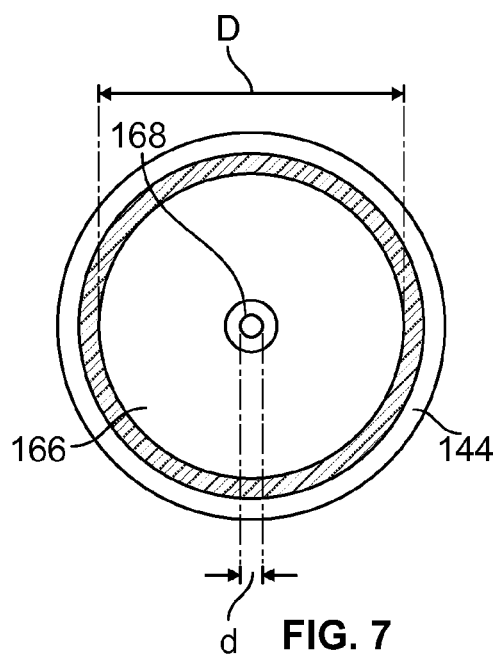
FIG. 7 is an enlarged sectional view of a dip tube and a restrictor generally taken along the line 7-7 of FIG. 6.

In the current embodiment, the concentrate valve 162 includes a restrictor 166. The restrictor 166 performs a metering function by controlling the amount of concentrate 130 that is delivered to the mixing chamber 142 through an outlet 168. The restrictor 166 and the outlet 168 of the restrictor 166 may have any cross-sectional shape, such as circular, rectangular, triangular, star-shaped, or any other shape known to one of ordinary skill in the art. FIG. 7 is an enlarged sectional view of the restrictor 166, having a generally circular cross section, looking down the longitudinal axis 152. The outlet 168 has a diameter d that is smaller than an inner diameter D of the dip tube 144. In one embodiment, D is about 0.094 inches to about 0.102 inches. In a preferred embodiment, D is about 0.100 inches. In one embodiment, d is about 0.020 inches to about 0.028 inches. In a preferred embodiment, d is about 0.026 inches. In examples where the dip tub 144 has a non-circular cross-sectional shape, the diameter d can be interpreted as the greatest cross-sectional extent of the shape of the cross section. In other embodiments, the concentrate valve 162 does not include a restrictor 166. In still other embodiments, the solvent valve 164 includes a restrictor.

Referring back to FIG. 6, upon activation by the pull and release of the trigger 138, the concentrate valve 162 draws a metered dose of the concentrate 130 from the bottle 112 that is subsequently delivered to the mixing chamber 142. Similarly, once activated by the trigger 138, the solvent valve 164 draws a metered dose of the solvent substance 106 from the solvent reservoir 104 and delivers the metered dose to the mixing chamber 142. Once the metered doses of the concentrate 130 and the solvent substance 106 are delivered within the mixing chamber 142 they are mixed by virtue of their retention in the chamber 142 and the movement of the concentrate 130 and the solvent substance 106. Further, an optional internal bellow or other valve, such as a flap valve 170, may assist in the mixture of the concentrate 130 and the solvent substance 106. During activation, the pump mechanism 114 mixes the concentrate 130 and the solvent substance 106 to form the dispensable mixture 136. Following the mixing process, the optional internal bellow or flap valve 170 compresses and delivers the dispensable mixture 136 via an exit fluid path 172 to the nozzle 140 where it is released and sprayed into the environment. It has also been contemplated that the pump mechanism 114 does not include the internal bellow or flap valve 170.

In some embodiments, the trigger sprayer 108 may come pre-primed from the manufacturer or the user may be required to prime the pump mechanism 114 by depressing the trigger 138 one or more times as described herein. Further, in lieu of a conventional pump-type sprayer, a pre-compression pump sprayer may be used. The trigger sprayer 108 may optionally include a lock (not shown) that prevents the accidental discharge of materials.

The ratio of the solvent substance 106 to the concentrate 130 may be controlled by a variety of methods, including for example, the size of the pump mechanism 114, the area or structure of any valves (see FIG. 6) within the pump mechanism 114, a metering mechanism within or separate from the pump mechanism 114 such as the restrictor 166, and any means known to those having skill in the art.

Upon activation of the trigger 138, the pump mechanism 114 automatically delivers a metered dose volume of both the concentrate 130 and the solvent substance 106 in an appropriate ratio to facilitate the purpose of the dispensing solution (e.g., cleansing, degreasing, disinfecting, rinsing, deodorizing, polishing, killing insects, and the like, and combinations thereof) into the pump mechanism 114 and/or discrete mixing chamber 142. Subsequently, the solvent substance 106 and the concentrate 130 are mixed and the measured and metered ratio of the solvent substance 106 to the concentrate 130 is dispensed into the environment via the nozzle 140. In one embodiment, the ratio of solvent substance 106 to the concentrate 130 may comprise about 2 parts solvent substance 106 to about 1 part concentrate (2:1), about 4 parts solvent substance 106 to about 1 part concentrate (4:1), about 6 parts solvent substance 106 to about 1 part concentrate (6:1), about 8 parts solvent substance 106 to about 1 part concentrate (8:1), about 10 parts solvent substance 106 to about 1 part concentrate (10:1), about 12 parts solvent substance 106 to about 1 part concentrate (12:1), about 15 parts solvent substance 106 to about 1 part concentrate (15:1), or about 64 parts solvent substance 106 to about 1 part concentrate (64:1).

The desired ratio of the solvent substance 106 to the concentrate 130 may also vary depending upon the relative viscosities of the solvent substance 106 and the concentrate 130. The viscosity of the solvent substance 106 at 25° C. may be less than about 1 centipoise (cps), about 0.5 cps, about 0.8 cps, about 1 cps, about 2 cps, about 3 cps, about 4 cps, about 5 cps, about 10 cps, about 25 cps, about 50 cps, about 75 cps, about 100 cps, or about 0.1 cps to about 10 cps, about 1 cps to about 100 cps, about 1 cps to about 50 cps, about 25 cps to about 75 cps, or about 50 cps to about 100 cps.

Similarly, the viscosity of the concentrate 130 at 25° C. may be less than about 1 cps, about 0.5 cps, about 0.8 cps, about 1 cps, about 2 cps, about 3 cps, about 4 cps, about 5 cps, about 10 cps, about 25 cps, about 50 cps, about 75 cps, about 100 cps, about 250 cps, about 500 cps, or about 0.1 cps to about 10 cps, about 1 cps to about 50 cps, about 25 cps to about 75 cps, about 50 cps to about 100 cps, about 100 cps to about 500 cps, or about 250 cps to about 500 cps.

As mentioned above, the ratio of the solvent substance 106 to the concentrate 130 may be controlled by a variety of methods. In the present embodiment the desired ratio of the solvent substance 106 to the concentrate 130 is about 8 parts solvent substance to about 1 part concentrate (8:1). One way to obtain the desired solvent to concentrate ratio is to modify the size of the outlet 168 of the restrictor 166 in communication with the concentrate valve 162. To realize the desired 8:1 solvent to concentrate ratio with a concentrate 130 having a viscosity of about 1 cps to about 75 cps, the outlet 168 of the restrictor 166 preferably has a diameter "d" of about 0.026 inches. Further, it has been found that if the size of the outlet 168 of the restrictor 166 is increased by ±0.002 inches, the ratio of the solvent substance 106 to the concentrate 130 is dramatically altered.

It has been found that when the concentrate 130 has a viscosity of about 201 cps to about 250 cps the dip tube 144, having a D of about 0.100 inches, does not require the concentrate valve 162 or restrictor 166 to deliver a metered dose of the concentrate 130 to the mixing chamber 142. In this scenario, the inner diameter "D" of the dip tube 144 and the viscosity of the concentrate 130 solely produces the desired 8:1 solvent to concentrate ratio without the need for the concentrate valve 162 or restrictor 166. In one example, the desired 8:1 solvent to concentrate ratio was achieved with no concentrate valve 162 or restrictor 166 by using a concentrate 130 having a viscosity of about 230 cps.

To maintain a constant solvent to concentrate ratio it has been found that the types of valves used for the concentrate valve 162 and the solvent valve 164 are important. When the concentrate substance 130 has a viscosity greater than about 75 cps it is preferred to use a disk valve in connection with the concentrate valve 162. When a duckbill valve is used with a solution having a viscosity greater than 75 cps the valve often fails, for example, by folding in on itself or by softening or by sticking to itself or corroding over time. When a flap valve is used with a solution having a viscosity greater than 75 cps the valve causes inconsistent ratios of the solvent substance 106 to the concentrate 130.

Another way to obtain the desired solvent to concentrate ratio is to modify the viscosity of the concentrate 130 entering the mixing chamber 142. As stated above, it was found that when the concentrate 130 has a viscosity greater than about 75 cps the dip tube 144 did not require the concentrate valve 162 or restrictor 166 to deliver a metered dose of the concentrate 130 to the mixing chamber 142. This results in a sprayer system 100 requiring fewer components, which would allow for a lower cost sprayer.

In one embodiment, the concentrate 130 can be altered by combining it with an effective amount of a concentrate additive to modify the viscosity of the concentrate 130. By "concentrate additive" we mean any fluid which, when combined with the concentrate 130, effectively modifies the viscosity of the concentrate 130. An example of a concentrate additive is a surfactant thickener. Some commercially available thickeners include GENAPOL®, with molecular weights between 100 and 4000, CARBOPOL® with similar molecular weights, or ALKOX® thickeners from Meisei Chemical Works, LTD, of Kyoto, Japan, which have molecular weights ranging between 100,000 and 8,000,000. Particular examples of GENAPOL® that may be suitable in the current invention include, for example, GENAPOL O 080, GENAPOL O 100, GENAPOL O 120, GENAPOL O 200, GENAPOL T 080, GENAPOL T 110, GENAPOL T 150, GENAPOL T 200, GENAPOL T 250, GENAPOL T 500 and GENAPOL T 800. Particular examples of concentrate additives that may be used include ALKOX® thickeners, such as, for example, ALKOX R-150, ALKOX R-400, ALKOX R-1000, ALKOX E-30, ALKOX E-45, ALKOX E-60, ALKOX E-75, and ALKOX L-11. Additionally, other thickeners such as xanthum gum may be used with the concentrate.

Another type of concentrate additive that can be used to modify the viscosity of the concentrate 130 is a non- Newtonian fluid concentrate additive. By "non-Newtonian fluid" we mean any fluid wherein the viscosity is not constant, and which acts as a shear-thinning agent (where the viscosity decreases as the shear rate increases) or a shear-thickening agent (where the viscosity increases as the shear rate increases). It was surprisingly found that when a shear-thickening non-Newtonian fluid concentrate additive was combined with the concentrate 130 in the sprayer system 100, instead of exiting the spray nozzle 140 in a fan-like spray pattern, the dispensable mixture 136 exited the spray nozzle 140 as a solid stream.

By adding an effective amount of a non-Newtonian fluid concentrate additive to the concentrate 130, the viscosity of the concentrate 130 may be manipulated to modify the spray pattern of the concentrate 130. The viscosity of a liquid primarily affects spray pattern formation. Liquids with a high viscosity provide a narrower spray pattern formation and yield narrower spray angles as compared to water. By adding the non-Newtonian fluid concentrate additive and modifying the viscosity of the concentrate, the spray pattern of the concentrate is modified. The effective amount of concentrate additive to be added to the concentrate 130 to increase the viscosity of the concentrate 130 for providing the desired spray pattern will depend on the desired viscosity of the concentrate 130, as determined by the skilled user.

In one embodiment, the concentrate additive may be any non-Newtonian fluid concentrate additive known to the art. In one particular embodiment, the enhancer may include a polyethylene oxide polymer such as polyethylene glycol (PEG), including PEG-150 distearate, PEG-7 glyceryl cocoate, PEG-200 hydrogenated glyceryl palmate and PEG-120 methyl glucose dioleate. PEG-thickeners are water-soluble and provide emulsifying properties that help to stabilize emulsions. Suitable poly(ethylene oxide) polymers include, without limitation, POLYOX™ WSR N-750, POLYOX™ WSR N-3000, POLYOX™ WSR-205, POLYOX™ WSR-1105, POLYOX™ WSR N-12K, POLYOX™ WSR-301, POLYOX™ WSR-303, POLYOX™ WSR-308, which are commercially available from The Dow Company, of Midland, Mich.

Other suitable concentrate additives include nonionic, high molecular weight, water-soluble poly(ethylene oxide) resins. In one embodiment, an effective amount of a poly (ethylene oxide) resin such as POLYOX™ WSR 3000 may be combined with the concentrate 130 to increase the viscosity of the concentrate 130 to a viscosity ranging from, for example, about 100 cps to about 150 cps. In one embodiment, an effective amount of POLYOX™ WSR 3000 can raise the viscosity of the concentrate 130 to about 125 cps to about 135 cps, or about 130 cps to about135 cps. In fact, utilization of either POLYOX™ WSR-205 or POLYOX™ WSR 3000 resulted in a spray pattern emitted as a thin stream, even though a provided spray insert was fashioned to effect a fan-like spray pattern, which was the effect on fluid emitted without a non-Newtonian concentrate additive.

Referring back to FIGS. 1-5, the central placement of the trigger sprayer 108 between the solvent reservoir 104 and the bottle 112 may provide for an internal ergonomic geometry of the sprayer system 100. The viscosity and volume of both the solvent substance 106 and the concentrate 130 may define a separate weight of each of the fluid containing components (i.e., the solvent reservoir 104 and the bottle 112) positioned respectively on the top and bottom of the trigger sprayer 108. Thus, the sprayer system 100 may provide a comfortable internal ergonomic geometry that facilitates the ease of holding and use by the user. The sprayer system 100 may be adjusted to provide an internal ergonomic geometry, e.g., a sprayer system that is top heavy, a sprayer system that is bottom heavy, or a sprayer system that includes relatively equally weighted top and bottom components.

The internal ergonomic geometry of the sprayer system 100 includes a center of gravity 150 about a longitudinal axis 152 and a central axis 154 (see FIG. 5), substantially transverse thereto, about which the mass of the sprayer system 100 is distributed substantially equally. For example, the center of gravity 150 about both the longitudinal axis 150 and the central axis 152 may be substantially equally balanced, within about 10% of being equally balanced, within about 15% of being equally balanced, within about 20% of being equally balanced, within about 25% of being equally balanced, within about 30% of being equally balanced, within about 40% of being equally balanced, or within about 50% of being equally balanced. In another embodiment, the center of gravity 150 about the longitudinal axis 152 may be substantially equally balanced, within about 10% of being equally balanced, within about 15% of being equally balanced, within about 20% of being equally balanced, within about 25% of being equally balanced, within about 30% of being equally balanced, within about 40% of being equally balanced, or within about 50% of being equally balanced. In yet another embodiment, the center of gravity 150 about the central axis 154 may be substantially equally balanced, within about 10% of being equally balanced, within about 15% of being equally balanced, within about 20% of being equally balanced, within about 25% of being equally balanced, within about 30% of being equally balanced, within about 40% of being equally balanced, or within about 50% of being equally balanced. Thus, the mass of the solvent reservoir 104 and the bottle 112 may be substantially equally distributed about the longitudinal axis 152 and/or the central axis 154 to prevent the sprayer system 100 from rotating forward or backward in a user's hand, or otherwise providing undue pressure, torque, or force on a user's hand that may impact prolonged use of the sprayer system 100. For example, either filled or empty the solvent reservoir 104 and the bottle 112 may be substantially equally weighted about the longitudinal axis 152 and/or the central axis 154, or exhibit a difference in mass of about 10%, about 15%, about 20%, about 25%, about 30%, about 40%, or about 50%.

In one embodiment, the center of gravity 150 of the sprayer system 100 may translate along the longitudinal axis 152 and/or along the central axis 154 to provide a specific internal ergonomic geometry. For example, the sprayer system 100 may include an internal ergonomic geometry resulting in a top heavy sprayer system 100 in which the center of gravity 150 is substantially translated along the longitudinal axis 152 in a direction toward the top of the sprayer system 100 (i.e., toward the reservoir lid 116). In another embodiment, the sprayer system 100 may include an internal ergonomic geometry resulting in a front loaded sprayer system 100 in which the center of gravity 150 is substantially translated along the central axis 154 in a direction transverse to that of the longitudinal axis 152 toward the front of the sprayer system 100 (i.e., directed toward the nozzle 140). In yet another embodiment, the sprayer system 100 may include an internal ergonomic geometry resulting in a back loaded sprayer system 100 in which the center of gravity 150 is substantially translated along the central axis 154 in a direction transverse to that of the longitudinal axis 152 toward the back of the sprayer system 100 (i.e., directed away from the nozzle 140). In yet another embodiment, the sprayer system 100 may include an internal ergonomic geometry resulting in a bottom heavy sprayer system 100 in which the center of gravity 150 is substantially translated along the longitudinal axis 152 in a direction toward the bottom of the sprayer system 100 (i.e., directed toward the bottom surface 132 of the bottle 112).

The viscosities of the solvent substance 106 within the solvent reservoir 104 and the concentrate substance 130 within the bottle 112 may contribute to the internal ergonomic geometry of the sprayer system 100. In one embodiment, and assuming an equal volumetric quantity of fluid within the solvent reservoir 104 and the bottle 112, the viscosity of the concentrate substance 130 within the bottle 112 may be of a substantially equal viscosity as that of the solvent substance 106. The relatively equal viscosities of the top fluid component (i.e., the solvent substance 106) and the bottom fluid component (i.e., the concentrate substance 130) may result in a substantially equally weighted and balanced sprayer system 100 about both the longitudinal axis 152 and the central axis 154. In another embodiment, the concentrate substance 130 within the bottle 112 may have a viscosity substantially less than that of the viscosity of the solvent substance 106. The relatively smaller viscosity of the bottom fluid component, the concentrate substance 130, as compared to the viscosity of the top fluid component, the solvent substance 106, may result in a substantially top heavy sprayer system 100 about the longitudinal axis 152. In a further embodiment, the concentrate substance 130 within the bottle 112 may have a viscosity substantially greater than that of the viscosity of the solvent substance 106. The relatively greater viscosity of the bottom fluid component, the concentrate substance 130, as compared to the viscosity of the top fluid component, the solvent substance 106, may result in a substantially bottom heavy sprayer system 100 about the longitudinal axis 152.

Similarly, the volumetric quantities within the solvent reservoir 104 and the bottle 112 may contribute to the internal ergonomic geometry of the sprayer system 100. In one embodiment, and assuming an equal viscosity of fluid within the solvent reservoir 104 and the bottle 112, the bottle 112 may contain a volumetric quantity substantially equal to the volumetric quantity of the solvent reservoir 104. The relatively equal volumetric quantity of the top component, the solvent reservoir 104, and the bottom component, the bottle 112, may result in a substantially equally balanced sprayer system 100 about the longitudinal axis 152 of the sprayer system 100. In another embodiment, the bottle 112 may hold a volumetric quantity substantially less than that of the volumetric quantity of the solvent reservoir 104. The relatively smaller volumetric quantity of the bottom component, the bottle 112, as compared to the volumetric quantity of the top component, the solvent reservoir 104, may result in a substantially top heavy sprayer system 100 about the longitudinal axis 152 of the sprayer system 100. In a further embodiment, the bottom component, the bottle 112, may hold a volumetric quantity substantially greater than the volumetric quantity of the solvent reservoir 104, which may result in a substantially bottom heavy sprayer system 100 about the longitudinal axis 152 of the sprayer system 100.

The following example sets forth preferred materials and methods in accordance with one embodiment. It is to be understood, however, that this example is provided by way of illustration and nothing herein should be taken as a limitation upon the overall scope of the present disclosure.

EXAMPLE 1

Stain Removal Using Heated Water as a Solvent and Detergent as the Concentrate

The objective of this example was to determine the performance of the sprayer system 100 in the context of stain removal with different solventsubstance 106 temperatures and different dwell times.

Materials and Methods: The ASTM D4265—Standard Guide for Evaluating Stain Removal Performance in Home Laundering, was followed for Example 1. The following is a summary of the specific materials used and steps taken. A 100% Kona Cotton fabric was chosen to apply different staining agents to. The fabric was washed prior to application of the stains and cut into test swatches. The staining agents chosen were KC Masterpiece® BBQ sauce, dust sebum at 100° F., and Hershey's® chocolate syrup. The stains were pipetted onto the 100% Kona Cotton fabric testing swatches and rubbed in a circular motion to evenly distribute the material, thereby obtaining a final diameter of about 1.25 inches to about 1.75 inches. The stains were allowed to dry at room temperature for a minimum of about 4 hours before pre-treating. A bottle, similar to the bottle 112, was filled with a concentrated form of a commercially available pre-packaged SHOUT® stain remover sold by S. C. Johnson & Son, Inc. of Racine, Wis. The solvent reservoir 104 of the sprayer system 100 was filled with water at 140° F. or 75° F., depending on the test. Once the sprayer system 100 was assembled and attached to the bottle 112, the nozzle 140 was directed at a stained portion of the fabric and then the trigger 138 was squeezed 3 times. After the fabric was pre-treated with the dispensable mixture 136 from the sprayer system 100, the dispensable mixture 136 was allowed to dwell on the stained portion for a set period of time. Once the predetermined dwell time lapsed, either 1 minute or 5 minutes, the fabric was then placed in a Whirlpool Quiet Wash Ultimate Care II—Model number LSQ8543JQ0 washing machine with a load size set to medium load, a wash temperature of 90° F., a rinse temperature of 65° F., and with a non-enzyme containing detergent. The test swatches were then placed in a machine dryer at a high setting for about 45 minutes. A Minolta photoelectric colorimeter was then calibrated and set to a Delta E mode, which outputs the difference between a target valve and the reflectance of the stained portion. To set the target value for the Delta E mode, the colorimeter head was placed on an unstained portion of the fabric and the "Target Color Set" key was pressed. After the target value was set, the colorimeter head was moved to the center of the stained portion and the "Measure" button was pressed. The difference between the reflectance of the unstained portion of the fabric and the reflectance of the stained fabric was recorded for each test. The tests were repeated three times each.

Results: The test was utilized to determine if the temperature of the water mixed with the detergent in the sprayer system 100 would affect the effectiveness of the stain removal process, as well as the effect of different dwell times. Four different treatment combinations, see Table 1, were tested.

TABLE 1

Treatment Combinations

| | | |
|---|---|---|
| 01 | 140° F. Water | Pre-treat, wait 5 minutes, and launder |
| 02 | 75° F. Water | Pre-treat, wait 5 minutes, and launder |

TABLE 1-continued

| | | Treatment Combinations |
|---|---|---|
| 03 | 140° F. Water | Pre-treat, wait 1 minute, and launder |
| 04 | 75° F. Water | Pre-treat, wait 1 minute, and launder |

These treatment combinations were performed on each of the staining agents, i.e., BBQ sauce, sebum, and chocolate syrup. Each test was repeated three times and the difference in reflectance was recorded and averaged over the three tests. A student's t-test was performed with Microsoft Excel with a significance level set at 0.05. Table 2 shows the results comparing the difference in water temperature.

TABLE 2

Stain Removal Results vs. Temperature

| Staining Agent | Treatment Combination | Test 1 | Test 2 | Test 3 | Average | p-value |
|---|---|---|---|---|---|---|
| BBQ Sauce | 01 - 140° F. Water, dwell 5 mins | 3.54 | 4.19 | 5.58 | 4.44 | 1.0000 |
| BBQ Sauce | 02 - 75° F. Water, dwell 5 mins | 6.92 | 4.37 | 4.60 | 5.30 | 0.4474 |
| BBQ Sauce | 03 - 140° F. Water, dwell 1 min | 2.26 | 4.71 | 2.95 | 3.31 | 1.0000 |
| BBQ Sauce | 04 - 75° F. Water, dwell 1 min | 11.13 | 8.62 | 9.42 | 9.72 | 0.3352 |
| Sebum | 01 - 140° F. Water, dwell 5 mins | 8.62 | 9.42 | 8.30 | 8.78 | 1.0000 |
| Sebum | 02 - 75° F. Water, dwell 5 mins | 11.13 | 8.62 | 9.42 | 9.72 | 0.3352 |
| Sebum | 03 - 140° F. Water, dwell 1 min | 10.85 | 9.26 | 10.55 | 10.22 | 1.0000 |
| Sebum | 04 - 75° F. Water, dwell 1 min | 9.64 | 10.30 | 9.02 | 9.65 | 0.4104 |
| Chocolate Syrup | 01 - 140° F. Water, dwell 5 mins | 4.81 | 6.24 | 4.51 | 5.19 | 1.0000 |
| Chocolate Syrup | 02 - 75° F. Water, dwell 5 mins | 6.88 | 4.83 | 3.80 | 5.17 | 0.9883 |
| Chocolate Syrup | 03 - 140° F. Water, dwell 1 min | 4.01 | 4.49 | 4.33 | 4.28 | 1.0000 |
| Chocolate Syrup | 04 - 75° F. Water, dwell 1 min | 5.49 | 5.41 | 6.13 | 5.68 | 0.0104* |

*<0.05% = significant difference at 95% confidence level

As seen in the last row of Table 2, the p-value is below the threshold chosen for statistical significance. Therefore, for a stain of chocolate syrup, pre-treating the stain with 75° F. water mixed with detergent from the sprayer system 100 does not remove the stain with the same rate of effectiveness as mixing 140° F. water with detergent in the sprayer system 100. As stated above, the data provided in tests 1-3 and the average column are the differences in reflectance of an unstained portion of the fabric to the stained portion of the fabric. Therefore, the lower the value, the better the stain removal.

A second student's t-test was performed with Microsoft Excel with a significance level set at 0.05. Table 3 shows the same test values from Table 2, however, this time the t-test compared the difference in dwell time.

TABLE 3

Stain Removal Results vs. Dwell Time

| Staining Agent | Treatment Combination | Test 1 | Test 2 | Test 3 | Average | p-value |
|---|---|---|---|---|---|---|
| BBQ Sauce | 01 - 140° F. Water, dwell 5 mins | 3.54 | 4.19 | 5.58 | 4.44 | 1.0000 |
| BBQ Sauce | 03 - 140° F. Water, dwell 1 min | 2.26 | 4.71 | 2.95 | 3.31 | 0.3003 |
| BBQ Sauce | 02 - 75° F. Water, dwell 5 mins | 6.92 | 4.37 | 4.60 | 5.30 | 1.0000 |
| BBQ Sauce | 04 - 75° F. Water, dwell 1 min | 11.13 | 8.62 | 9.42 | 9.72 | 0.8054 |
| Sebum | 01 - 140° F. Water, dwell 5 mins | 8.62 | 9.42 | 8.30 | 8.78 | 1.0000 |
| Sebum | 03 - 140° F. Water, dwell 1 min | 10.85 | 9.26 | 10.55 | 10.22 | 0.0798 |
| Sebum | 02 - 75° F. Water, dwell 5 mins | 11.13 | 8.62 | 9.42 | 9.72 | 1.0000 |
| Sebum | 04 - 75° F. Water, dwell 1 min | 9.64 | 10.30 | 9.02 | 9.65 | 0.9380 |
| Chocolate Syrup | 01 - 140° F. Water, dwell 5 mins | 4.81 | 6.24 | 4.51 | 5.19 | 1.0000 |
| Chocolate Syrup | 03 - 140° F. Water, dwell 1 min | 4.01 | 4.49 | 4.33 | 4.28 | 0.2257 |
| Chocolate Syrup | 02 - 75° F. Water, dwell 5 mins | 6.88 | 4.83 | 3.80 | 5.17 | 1.0000 |
| Chocolate Syrup | 04 - 75° F. Water, dwell 1 min | 5.49 | 5.41 | 6.13 | 5.68 | 0.6362 |

As seen in Table 3, no p-values were below the threshold chosen for statistical significance. Therefore pre-treating a stain with detergent mixed with water from the sprayer system 100 and letting it dwell for 1 minute removes the stain at the same rate of effectiveness as when a dwell time of 5 minutes is utilized.

Summary: When using the sprayer system 100 with a concentrated form of a commercially available pre-packaged detergent, such as SHOUT® sold by S. C. Johnson & Son, Inc., it was found that adding hot water to the solvent reservoir 104 and applying to a stain would remove the stain more effectively than with water at about room temperature. These results can easily be achieved with the sprayer system 100 simply by heating water before putting it into the solvent reservoir 104 and using a concentrated form of a detergent in the bottle 112. These results may not achieve by a standard premixed solution. Further, the ease of filling the solvent reservoir 104 with hot water is substantially greater than that of other prior art sprayers, making the present system more advantageous for an end user. Still further, the size and portability of the sprayer system 100 make removing stains easier for a user as well.

Figure 8:
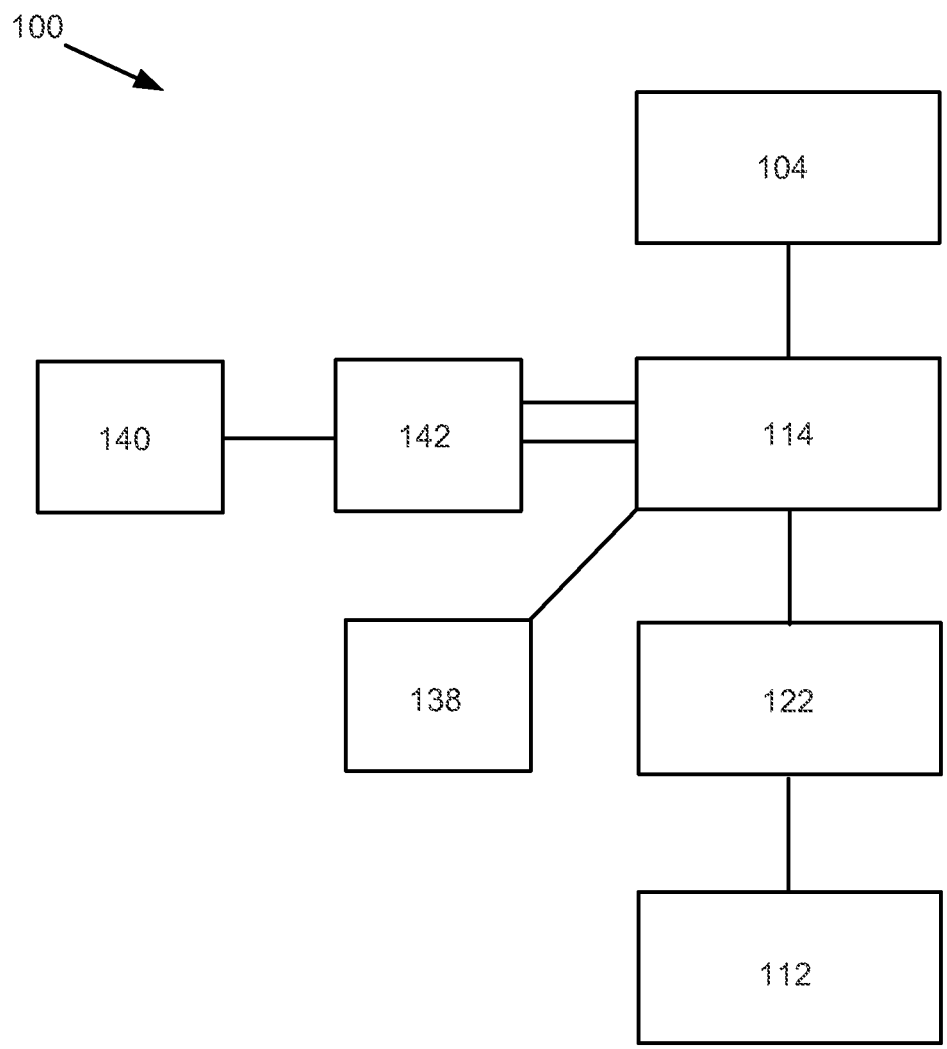
FIG. 8 is a schematic diagram of a sprayer system containing a concentrate.

Referring to FIG. 8, a schematic diagram of one specific embodiment of the sprayer system 100 is depicted. The sprayer system 100 generally includes a housing 156 (see FIG. 5) having the solvent reservoir 104 therein that contains the solvent substance 106. The pump mechanism 114 is also provided within the sprayer system 100, as well as a discrete mixing chamber or mixing chamber 142 within a portion of the pump mechanism 114, to facilitate mixing and dispensing of the concentrate substance 130 and the solvent substance 106. The sprayer system 100 further includes an actuation mechanism 138 to facilitate dispensing, the nozzle 140, through which the substance exits the sprayer system 100, and the attachment mechanism 122 for connecting the sprayer system 100 to a bottle 112 that contains the concentrate substance 130. The bottle 112 is designed to hold the concentrate substance 130 that mixes with the solvent substance 106. The sprayer system 100 is generally described including the aforementioned components, but the sprayer system 100 may be adapted to add or remove various components according to specific embodiments.

All of the component parts having been described, various methods associated with purchasing, distributing, and/or operating the sprayer system 100 will now be described. In particular, the sprayer system 100 may be provided as a kit.

After purchasing, the consumer takes the sprayer system 100, components, and/or kit to a location where they can be utilized. It is contemplated that the kit as used herein may solely comprise the sprayer system 100 itself without any accompanying components. It is also envisioned that the sprayer system 100 may be provided without packaging at a point of purchase, e.g., the sprayer system 100 could be hung by a portion of the system at a point of purchase or otherwise placed on a display shelf, rack, or bin. In other embodiments, the kit may comprise a sprayer system 100 that is provided in packaging and/or bundled with other components, e.g., one or more additional sprayers, an adapter, a dip tube, a concentration bottle, use instructions, etc.

It is further contemplated that non-traditional points-of-purchase may be utilized to increase the flexibility and convenience of the sprayer system 100 to consumers. For example, a traditional retailer having a physical store location may be replaced with an internet portal. In this instance, consumers could order a kit or kits that are predetermined by the manufacturer. Supplying the sprayer system 100 in this manner would be significantly less expensive than supplying a traditional dispensable product as known in the art due to the decreased size and weight of the sprayer system 100 described herein. Alternatively, a consumer could use the internet portal to create a custom kit with one or more of the sprayer system 100 components and concentrate as desired.

In a different embodiment, the sprayer system 100 is provided in a vending machine at locations with location-appropriate concentrated products. For example, a vending machine at a car wash could include sprayer system 100 kits with concentrated materials appropriate for cleaning and/or detailing automobiles. The vending machine may provide a source of consumer education on use of the sprayer system 100. Examples of sources of consumer education for use of the sprayer system 100 provided by the vending machine may include an LCD video screen, an interactive touch screen, an intuitive user interface, dynamic graphics, an instructional video or other video graphic, a commercial, an advertisement, a diagram, an instructional chart, a flow chart, instructional text, an infomercial, and the like, for providing consumer education on use of sprayer systems, or combinations thereof. Further, a traditional retail display could be replaced with an automated vending machine that could allow the consumer to select custom or pre-mixed concentrated material properties and fill or dispense a sprayer system 100 with custom or pre-mixed concentrated materials. The consumer could then purchase the customized sprayer system 100 through conventional means or through the vending machine.

The sprayer system 100 may be supplied to the consumer using a variety of distribution methods. For example, in one embodiment, the sprayer system 100 is distributed as a stand-alone trigger sprayer 108 and concentrate bottle 112 containing a concentrate disposed therein. In this embodiment, the consumer supplies the solvent substance 106. In a different embodiment, the sprayer system 100 is distributed as a multi-pack kit of one or more sprayer systems 100 that contain one or more different concentrates 130 and one or more solvent substances 106. The bottle(s) 112 optionally includes the concentrate(s) therein.

In some embodiments, the sprayer system 100 and/or kit may include instructions for use associated therewith. The instructions may be printed on the kit directly and/or may be supplied separately. In other embodiments, intuitive symbols may be utilized that direct the consumer to mate the trigger sprayer 108 with the bottle 112. It is also contemplated that one or more of the sprayer system 100 or kit may include a scan bar thereon that is compatible with a user's cellular phone, which would allow a user to pull up instructions, receive a promotional offer, view a video demonstration, receive information, etc.

Figure 9:
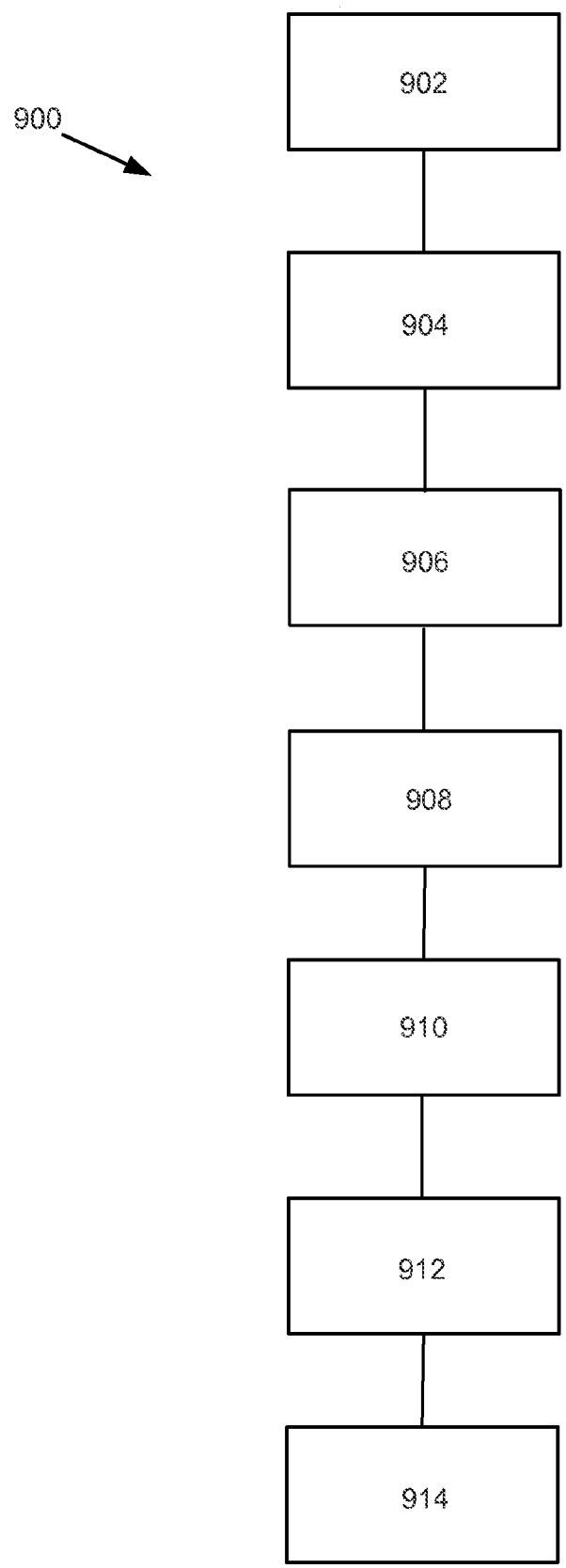
FIG. 9 is a flow chart generally depicting a method of using a sprayer system according to any of the embodiments described herein.

After purchasing, the consumer is ready to prepare and use the sprayer system 100 according to one or more of the methodologies described herein. For example, one method 900 for preparing and using the sprayer system 100 is depicted in FIG. 9. In a first step, the consumer unpacks the sprayer kit at block 902 and selects a concentrate bottle to be used at block 904 according to the desired task. If the concentrate bottle is not attached to the trigger sprayer, the consumer can attach the sprayer system 100 either directly, or using a connecting adapter, to the neck of the concentrate bottle at block 906. The consumer then selects an appropriate solvent (either provided by the consumer or included in the kit). If the solvent reservoir is empty, the consumer fills the solvent reservoir with the selected solvent to a selected fill volume and seals the solvent reservoir with the liquid tight seal of the reservoir lid, thereby readying the sprayer system 100 for use at block 908.

Next, at block 910, the consumer may determine a desired ergonomic geometry for the sprayer system 100 and either remove or add additional solvent substance 106 or concentrate substance 130 to achieve that geometry. Alternatively, block 910 may optionally be performed contemporaneously or prior to block 908. For example, the consumer may select to configure the sprayer system 100 to exhibit an ergonomic geometry of a bottom heavy sprayer system 100. To achieve a bottom heavy sprayer system 100 ergonomic geometry, the consumer may either remove some of the solvent substance 106 from the solvent reservoir 104 and/or may add additional concentrate substance 130 to the bottle 112.

The kit may provide instructions on achieving varied ergonomic geometries of the sprayer system 100. In one embodiment, the kit may provide a known volume of concentrate substance 130 at a specific known viscosity and instructions to direct the consumer to fill the solvent reservoir 104 to a selected fill volume which is less than or equal to the absolute volume of the solvent reservoir 104 in order to achieve the center of gravity 150 about the longitudinal axis 152 and/or the central axis 154 (see FIG. 5) that is substantially equally balanced or otherwise preferred for a particular intended use. For example, the consumer may be directed to add a sufficient elected volume of solvent substance 106 to create the center of gravity 150 that may be substantially equally distributed or balanced about both the longitudinal axis 152 and the central axis 154, or that is within about 10% of being equally balanced, within about 15% of being equally balanced, within about 20% of being equally balanced, within about 25% of being equally balanced, within about 30% of being equally balanced, within about 40% of being equally balanced, or within about 50% of being equally balanced about both the longitudinal axis 152 and the central axis 154. In another embodiment, the consumer may be directed to add a sufficient elected volume of solvent substance 106 to create the center of gravity 150 that may be substantially equally distributed or balanced about the longitudinal axis 152, or that is within about 10% of being equally balanced, within about 15% of being equally balanced, within about 20% of being equally balanced, within about 25% of being equally balanced, within about 30% of being equally balanced, within about 40% of being equally balanced, or within about 50% of being equally balanced about the longitudinal axis 152. In yet another embodiment, the consumer may be directed to add a sufficient elected volume of solvent substance 106 to create the center of gravity 150 that may be substantially equally distributed or balanced about the central axis 154, or that is within about 10% of being equally balanced, within about 15% of being equally balanced, within about 20% of being equally balanced, within about 25% of being equally balanced, within about 30% of being equally balanced, within about 40% of being equally balanced, or within about 50% of being equally balanced about the central axis 154.

Once the ergonomic geometry of the sprayer system 100 is adjusted to the consumer's preferences, the sprayer system 100 is ready for use as desired at block 912. When dispensing is complete, the consumer can remove the trigger sprayer from the bottle at block 914. The consumer may optionally place the trigger sprayer in storage with the rest of the kit at block 914. Optionally, at block 914, the consumer may select a different concentrate bottle 112 or solvent substance 106 as desired and follow the same process to utilize the sprayer system 100.

Figure 10:
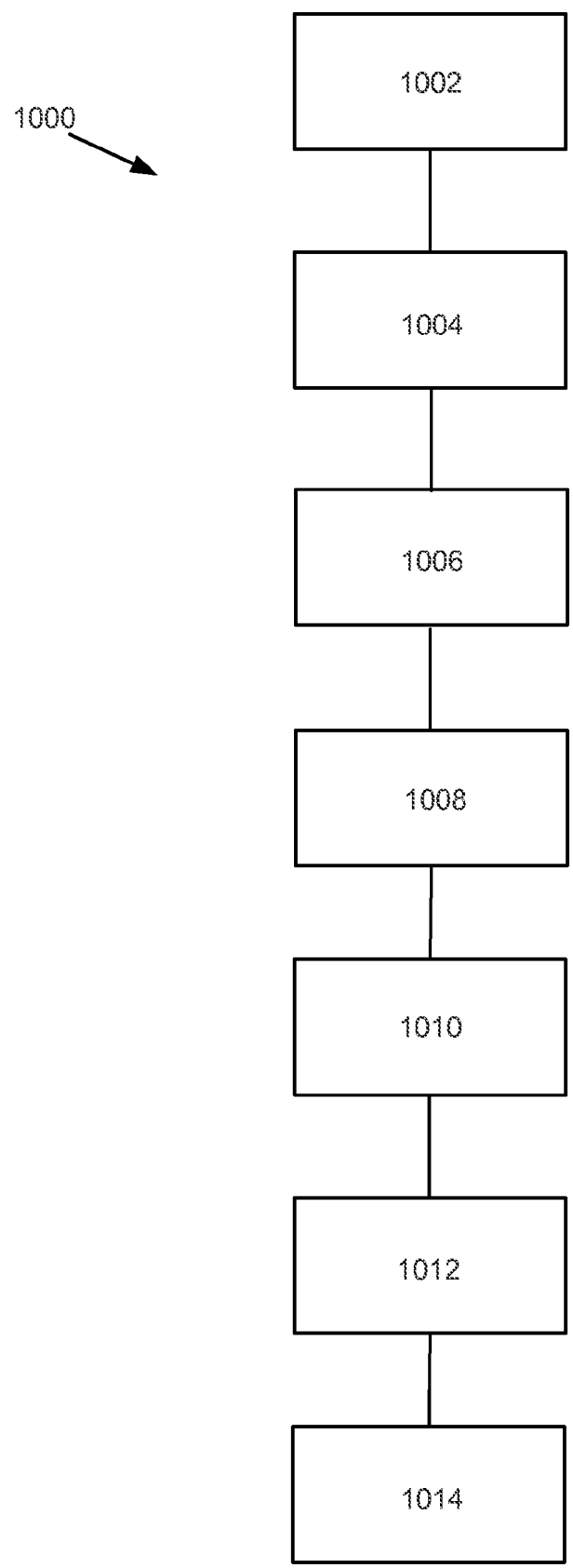
FIG. 10 is a flow chart generally depicting another method of using a sprayer system according to any of the embodiments described herein.

A method 1000 for preparing and using the sprayer system 100 for stain removal is depicted in FIG. 10. In a first step, the consumer unpacks the sprayer kit at block 1002 and selects a concentrate bottle to be used at block 1004. The concentrate 130 in the concentrate bottle 112 is a concentrated form of a commercially available pre-packaged SHOUT® stain remover sold by S. C. Johnson & Son, Inc. The consumer then attaches the sprayer system 100 either directly, or using a connecting adapter, to the neck of the concentrate bottle at block 1006. The consumer fills the solvent reservoir with water that is about, or at least about, 140° F. to a selected fill volume and seals the solvent reservoir with the liquid tight seal of the reservoir lid, thereby readying the sprayer system 100 for use at block 1008.

Next, at block 1010, the consumer points the nozzle of the sprayer system 100 at a stained or soiled surface and squeezes the trigger. The trigger can be squeezed 1 or more times, depending on the size of the stain. The stained surface with the dispensable mixture is left to sit for a predetermined dwell time at block 1012. The dwell time is preferably between about 1 to about 5 minutes. After the dwell time has lapsed, the consumer can then clean the stained surface as desired at block 1014.

In a particular embodiment, the method 1000 can be applied to laundering a stained or soiled article as well. Blocks 1002-1008 would remain the same. At block 1010, the consumer points the nozzle of the sprayer system 100 at a stained article and squeezes the trigger. At block 1012, the stained article with the dispensable mixture is left to sit for a predetermined dwell time. Finally, at block 1014, after the dwell time has lapsed, the consumer can then launder the stained article as desired at block 1014.

As discussed previously, there are significant advantages of the sprayer system described herein as compared to sprayer systems of the prior art. For instance, one advantage is that the amount of shelf space or display space required to display and/or store the sprayer system is significantly less than that of typical cleaning and/or dispensing solutions. As a result, a larger variety of sprayer systems are able to be displayed and/or stored.

Additionally, the sprayer system 100 disclosed herein does not require that the consumer premix the concentrate 130 with the solvent substance 106. Rather, the sprayer system 100 mixes the correct amount of concentrate with each actuation of the trigger sprayer 108. Further still, the user can change between concentrated materials simply by replacing the concentrate bottle 112 attached to the trigger sprayer 108. For example, after using a concentrate bottle 112 containing a concentrated disinfectant spray, the user can remove the bottle and attach another concentrate bottle with different properties.

Still further, the sprayer system 100 of the present disclosure is environmentally friendly, simple to construct, and requires minimal materials. Once the concentrated material is consumed, the empty concentrate bottle can easily be disposed of and/or refilled. There is less waste material in the sprayer system 100 disclosed herein because the consumer is not required to premix the material and/or guess at the quantity that may be needed. It is envisioned that used sprayer systems 100 could be recycled and reused after being collected by the manufacturer or distributor at retail locations. Alternatively, the sprayer system 100 could be made of largely bio-degradable materials and placed in the trash when empty. The sprayer system 100 of the present disclosure may be configured in a variety of embodiments to promote the environmental friendliness of the product.

In addition, the sprayer system 100 disclosed herein is much smaller and more compact than conventional sprayer systems. The smaller size of the sprayer system 100 allows for a convenient carrying size that can provide ease and facility in reaching hard to reach areas for cleaning and/or storage in small areas (e.g., vehicle glove compartments, vanity drawers, tackle boxes, tool kits, hand bags, fishing kits, lunch boxes, or the like, or combinations thereof).

Further, the sprayer system 100 disclosed herein allows a user to remove stains from a surface or article much more effectively by using hot water in the solvent reservoir 104. This may not be achieved by a standard premixed solution. Further, the ease of filling the solvent reservoir 104 with hot water is substantially greater than that of other prior art sprayers, making the present system more advantageous for an end user. Still further, the size and portability of the sprayer system 100 make removing stains easier for a user as well.

Any of the embodiments described herein may be modified to include any of the structures or methodologies disclosed in connection with different embodiments. Further, the present disclosure is not limited to concentrated material sprayer systems of the type specifically shown. Still further, the concentrated material sprayer systems of any of the embodiments disclosed herein may be modified to work with any type of sprayer system that utilizes concentrated materials. All documents cited in the Detailed Description of the Invention are, in relevant part, entirely incorporated herein by reference; the citation of any document is not to be construed as an admission that it is prior art with respect to the present invention.

INDUSTRIAL APPLICABILITY

A sprayer system is presented that dispenses a mixture of concentrate and water into the surrounding environment through a discharge tube. The spray system is adapted to mix a solvent and concentrated materials in precise amounts. Thus, a consumer may experience the convenience of using a concentrated product without having to premix the concentrated material and solvent.

Numerous modifications will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the application are reserved.

We claim:

1. A sprayer system, comprising:
   a trigger sprayer including a trigger, a pump mechanism, and a nozzle;
   a solvent reservoir for accommodating a solvent substance; and
   a bottle for accommodating a concentrate substance,
   wherein the solvent reservoir is positioned above the trigger sprayer and is in fluid communication with the trigger sprayer, and
   wherein the bottle contains the concentrate substance, is positioned below the trigger sprayer and is in fluid communication with the trigger sprayer.

2. The sprayer system of claim 1, wherein the solvent substance is provided within the solvent reservoir and comprises at least one of water, tap water, distilled water, spring water, mineral water, deionized water, bleach, vinegar, an antibacterial solution, a deodorizing substance, a cleaning substance, a surfactant solution, a chelant solution, a degreasing solution, a soap solution, an alcohol, an insecticide, an enzyme solution, a color changing dye or indicator, a fragrance, a corrosion inhibitor, an anti-microbial, a preservative, an odor eliminator, a pH-adjuster, a surfactant, or a solvent mixed with particulates.

3. The sprayer system of claim 1, wherein the solvent reservoir includes a reservoir lid to provide a fluid tight seal.

4. The sprayer system of claim 1, wherein the concentrate substance comprises at least one of a fragrance, an insecticide, an insect repellent, a deodorizing agent, an odor eliminator, a mold or mildew inhibitor, a cleaning agent, a polisher, an enzyme, or combinations thereof.

5. The sprayer system of claim 1, wherein the concentrate substance comprises a non-Newtonian spray enhancer.

6. The sprayer system of claim 1, wherein the bottle includes a neck with threads to facilitate attachment to the trigger sprayer.

7. The sprayer system of claim 1, wherein the solvent reservoir has a fill volume of from about 10 mL to about 200 mL or about 50 mL to about 80 mL.

8. The sprayer system of claim 1, wherein the bottle has a fill volume of from about 100 mL to about 500 mL, or from about 250 mL to about 500 mL, or from about 100 mL to about 250 mL.

9. The sprayer system of claim 1, wherein upon actuation of the trigger, a dispensable mixture is released having a ratio of about 2 parts solvent substance to about 1 part concentrate substance or about 64 parts solvent substance to about 1 part concentrate substance.

10. A sprayer system, comprising:
    a solvent reservoir positioned above and in fluid communication with a trigger sprayer, and
    a concentrate bottle positioned below and in fluid communication with the trigger sprayer, and
    a dip tube configured to draw concentrate from the concentrate bottle for delivery to the trigger sprayer,
    wherein the trigger sprayer includes a trigger, a pump mechanism, and a nozzle, and
    wherein the pump mechanism includes at least two valves and a mixing chamber.

11. The sprayer system of claim 10, wherein the pump mechanism includes a concentrate valve in fluid communication with and positioned between the mixing chamber and a distal end of the dip tube and a solvent valve in fluid communication with and positioned between the solvent reservoir and the mixing chamber.

12. The sprayer system of claim 11, wherein the concentrate valve further includes a restrictor.

13. The sprayer system of claim 11, wherein the concentrate valve and solvent valve are one of a duckbill valve, a flap valve, or a disk valve.

14. The sprayer system of claim 13, wherein the concentrate valve and the solvent valve are formed from at least one of fluorosilicone, silicone, styrene-butadiene, nitrile, ethylene-propylene-diene-monomer (EPDM), natural rubber, butyl, ethylene, polyurethane, fluorocarbon, neoprene, or polytetrafluoroethylene (PTFE).

15. The sprayer system of claim 13, whereupon actuation of the trigger a dispensable mixture is released having a ratio of about 8 parts of a solvent substance from the solvent reservoir to about 1 part of a concentrate substance from the concentrate bottle.

16. A method for directing the use of a sprayer system, comprising:
    providing a sprayer system including a solvent reservoir, a trigger, a pump mechanism, and a nozzle, wherein the solvent reservoir is positioned above and in fluid communication with at least one of the pump mechanism, the trigger, and the nozzle;
    providing a bottle including a concentrate; and
    providing instructions for stain removal to a user comprising the steps of:
    unpacking the sprayer system,
    selecting and attaching the bottle to the sprayer system with the bottle positioned below and in fluid communication with at least one of the pump mechanism, the trigger, and the nozzle,
    filling the solvent reservoir with hot water,
    pointing the nozzle at a stained surface and squeezing the trigger of the sprayer system,
    letting the stained surface sit for a predetermined dwell time, and
    cleaning the stained surface.

17. The method of claim 16, wherein the concentrate is a concentrated form of a stain remover.

18. The method of claim 16, wherein the temperature of the water is at least about 140° F.

19. The method of claim 16, wherein the surface is an article and the article is cleaned by laundering the article.

20. The method of claim 16, wherein the dwell time is about 1 minute to about 5 minutes.

* * * * *